US006537170B2

(12) United States Patent
Murasugi et al.

(10) Patent No.: US 6,537,170 B2
(45) Date of Patent: Mar. 25, 2003

(54) SHIFT CONTROL SYSTEM FOR AUTOMATIC TRANSMISSION

(75) Inventors: Takashi Murasugi, Shizuoka (JP); Takashi Sano, Shizuoka (JP); Kazunari Otake, Shizuoka (JP)

(73) Assignee: Jatco Ltd., Fuji (JP)

( * ) Notice: Subject to any disclaimer, the term of this patent is extended or adjusted under 35 U.S.C. 154(b) by 0 days.

(21) Appl. No.: 09/954,017

(22) Filed: Sep. 18, 2001

(65) Prior Publication Data

US 2002/0035012 A1 Mar. 21, 2002

(30) Foreign Application Priority Data

Sep. 18, 2000 (JP) .................................. 2000-282314
Sep. 18, 2000 (JP) .................................. 2000-282315
Sep. 18, 2000 (JP) .................................. 2000-282317

(51) Int. Cl.⁷ .............................................. F16H 31/00
(52) U.S. Cl. ...................................... 475/128; 477/155
(58) Field of Search ................................ 477/155, 127, 477/128

(56) References Cited

U.S. PATENT DOCUMENTS

| | | | | |
|---|---|---|---|---|
| 5,467,854 A | * | 11/1995 | Creger et al. | 192/87.18 |
| 5,725,454 A | * | 3/1998 | Yasue et al. | 477/155 |
| 6,149,548 A | * | 11/2000 | Holbrook et al. | 477/155 |
| 6,285,942 B1 | * | 9/2001 | Steinmetz et al. | 701/67 |
| 6,319,172 B1 | * | 11/2001 | Steinmetz et al. | 477/143 |

FOREIGN PATENT DOCUMENTS

JP  1-224549  9/1989

OTHER PUBLICATIONS

U.S. patent application Ser. No. 09/936,811, Murasugi et al., filed Sep. 18, 2001.
U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,936, Kato, filed Sep. 18, 2001.
U.S. patent application Ser. No. 09/953,937, Saito, filed Sep. 18, 2001.
U.S. patent application Ser. No. 09/953,966, Saito, filed Sep. 18, 2001.
U.S. patent application Ser. No. 09/953,967, Saito, filed Sep. 18, 2001.
U.S. patent application Ser. No. 09/953,968, Saito, filed Sep. 18, 2001.
U.S. patent application Ser. No. 09/953,969, Saito, filed Sep. 18, 2001.
U.S. patent application Ser. No. 09/953,972, Saito, filed Sep. 18, 2001.
U.S. patent application Ser. No. 09/954,019, Saito, filed Sep. 18, 2001.
U.S. patent application Ser. No. 09/954,298, Saito, filed Sep. 18, 2001.

* cited by examiner

Primary Examiner—Dirk Wright
(74) Attorney, Agent, or Firm—Foley & Lardner

(57) ABSTRACT

A shift control system of an automatic transmission executes an interchange shift by interchanging engagement conditions of first and second friction elements of the automatic transmission. The first and second friction elements are engaged and disengaged according to oil pressures supplied thereto. A controller of the shift control system is arranged to decrease the second oil pressure of the second friction element by a second predetermined gradient and to increase the first oil pressure of the first friction element by a first predetermined gradient after the loss stroke of the first friction element is terminated, and to determine the first gradient such that a difference between a command pressure and an actual pressure of the first friction element is kept substantially constant.

15 Claims, 23 Drawing Sheets

FIG.2

|  | R/C | H/C | L/C | LR/B | L/OWC | 2-4/B |
|---|---|---|---|---|---|---|
| 1st |  |  | ○ | ◌ | ○ |  |
| 2nd |  |  | ○ |  |  | ○ |
| 3rd |  | ○ | ○ |  |  |  |
| 4th |  | ○ |  |  |  | ○ |
| Rev | ○ |  |  | ○ |  |  |

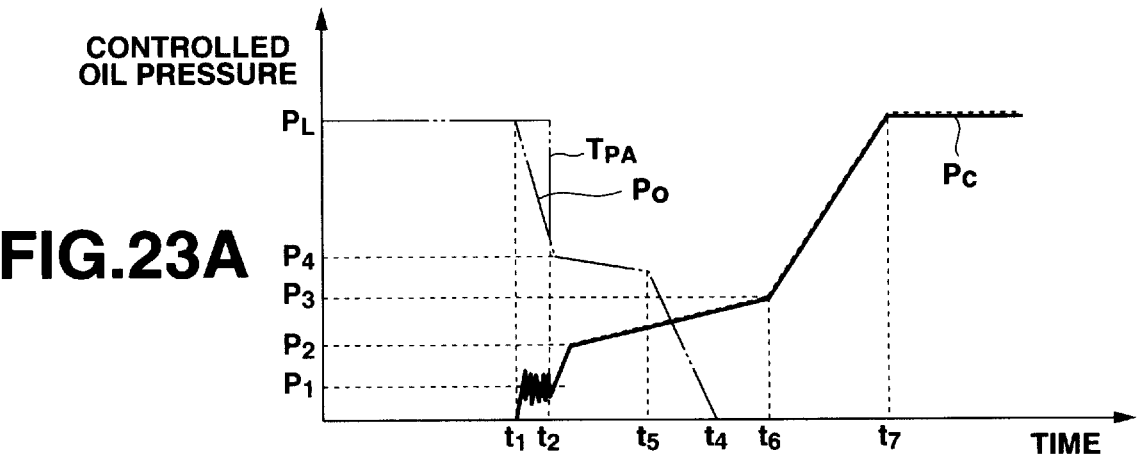
FIG.23A
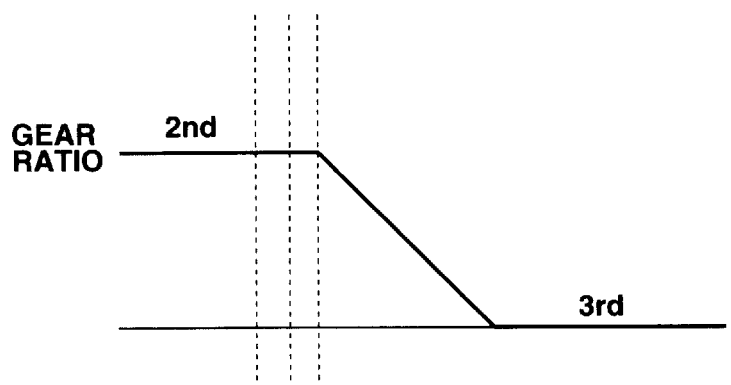
FIG.23B
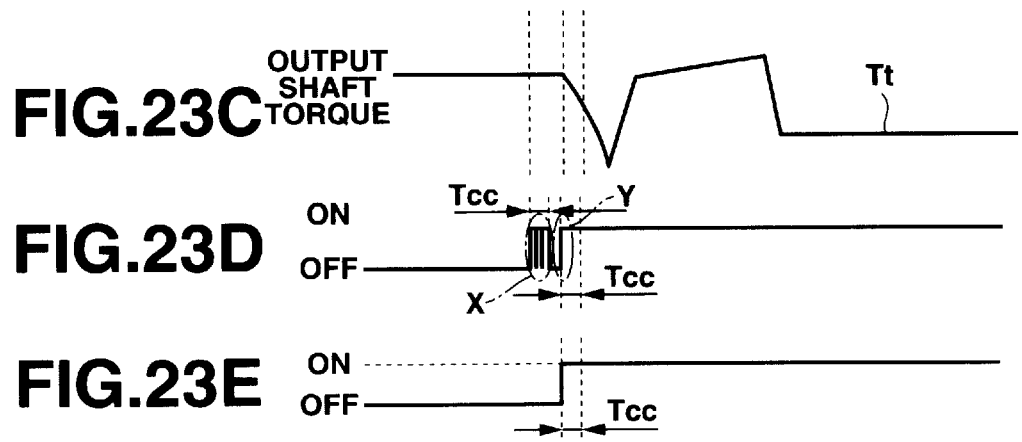
FIG.23C
FIG.23D
FIG.23E

SHIFT CONTROL SYSTEM FOR AUTOMATIC TRANSMISSION

BACKGROUND OF THE INVENTION

The present invention relates to a shift control system for an automatic transmission, and more particularly to a shift control system which suitably executes an interchange shift by engaging a first friction element of a plurality of friction element and by disengaging a second friction element of the friction elements after a pressure signal relating to an operation pressure of the first friction element is generated.

In order to realize a further smooth shift feeling during an interchange shift of an automatic transmission, various shift control systems for automatic transmissions have been proposed.

SUMMARY OF THE INVENTION

However, there is a demand to further improve an interchange shift of an automatic transmission.

It is therefore an object of the present invention to provide a shift control system which enables an interchange shift to be smoothly executed while suppressing the generation of shift shocks.

A shift control system according to the present invention is for an automatic transmission comprises a first friction element engaged by increasing a first oil pressure supplied to the first friction element and a second friction element disengaged by decreasing a second oil pressure supplied to the second friction element in response to a pressure signal of the first oil pressure. An interchange shift of the automatic transmission is executed by interchanging engagement conditions of the first and second friction elements. The shift control system comprises a controller which is arranged to decrease the second oil pressure of the second friction element by a second predetermined gradient after a loss stroke of the first friction element is terminated, to increase the first oil pressure of the first friction element by a first predetermined gradient after the loss stroke of the first friction element is terminated, and to determine the first gradient such that a difference between a command pressure and an actual pressure of the first friction element is kept substantially constant.

BRIEF DESCRIPTION OF THE DRAWINGS

FIG. 2 is a table showing a relationship between a selected shift position of the automatic transmission and engagement logic of friction elements.

FIGS. 23A, 23B, 23C, 23D and 23E are time charts for explaining the shift control employed in the modification of the third embodiment.

DETAILED DESCRIPTION OF THE INVENTION

Referring to FIGS. 1 to 8, there is shown a first embodiment of a shift control system according to the present invention.

Figure 1:
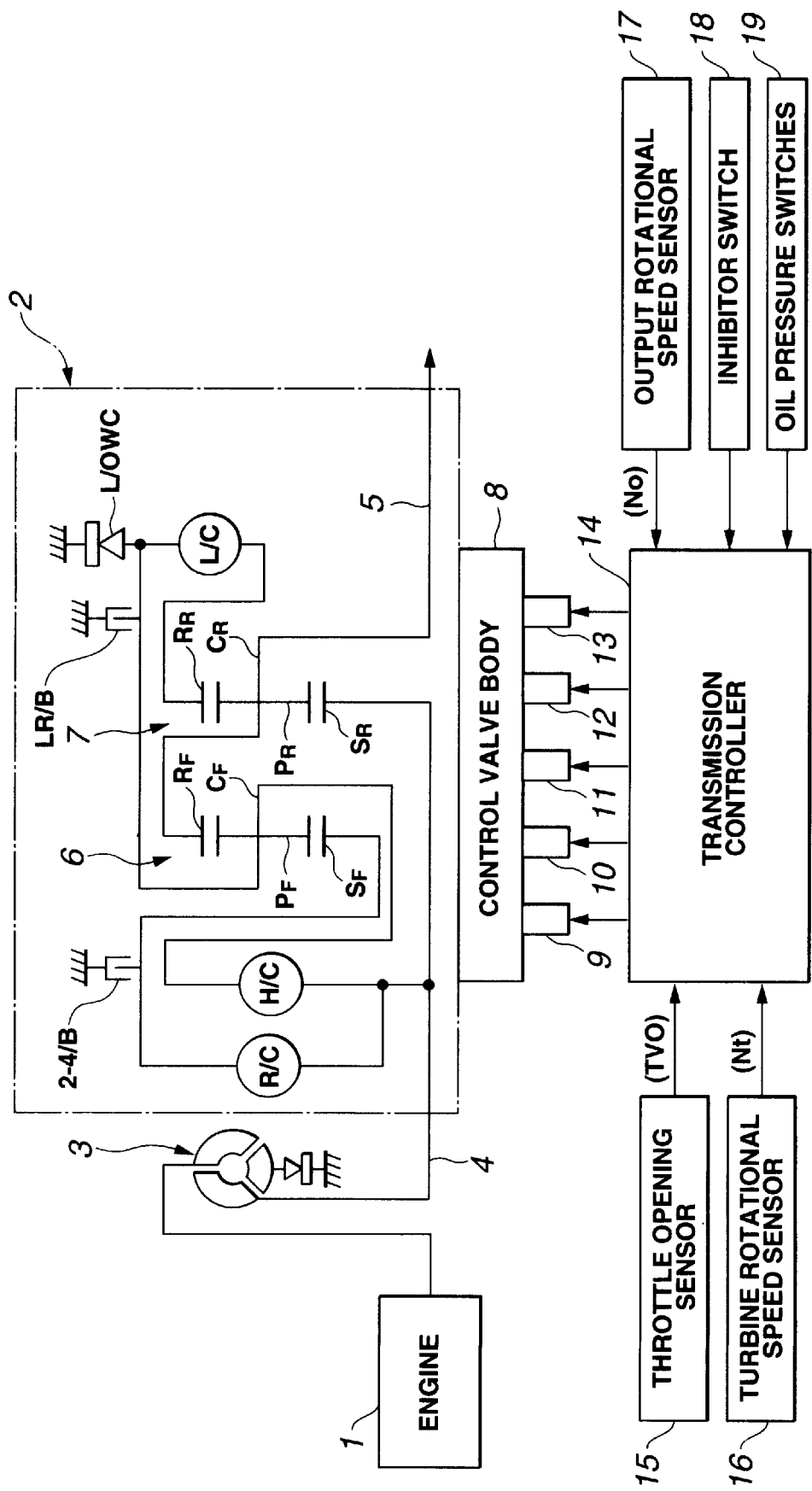
FIG. 1 is a schematic view showing a transmission trains and a shift control system of an automatic transmission and an automatic transmission control system according a first embodiment of the present invention.

As shown in FIG. 1, the shift control system includes an engine 1 and an automatic transmission 2. In accordance with the driver's depression of an accelerator pedal, a throttle valve varies its opening and thereby regulates the output of the engine 1. Output rotation of the engine 1 is transmitted through a torque converter 3 to an input shaft 4 of the automatic transmission 2.

In the transmission 2, front and rear planetary gear sets 6 and 7 are mounted on input and output shafts 4 and 5 which are aligned end to end. The front planetary gear set 6 is located on a front side close to engine 1. The front and rear planetary gear sets 6 and 7 are main components of a planetary speed change mechanism of automatic transmission 2.

The front planetary gear set 6 is a simple planetary gear set including a front sun gear $S_F$, a front ring gear $R_F$, front pinions $P_F$ engaging with the front sun and ring gears, and a front carrier $C_F$ supporting front pinions $P_F$ rotatably. The rear planetary gear set 7 is also a simple planetary gear set including a rear sun gear $S_R$, a rear ring gear $R_R$, rear pinions $P_R$ engaging with the rear sun and rear gears, and a rear carrier $C_R$ supporting rear pinions $P_R$ rotatably.

As friction elements (or devices) to determine a drive path (or speed) in the planetary gear train, there are a low clutch L/C, a 2-4 speed brake 2-4/B, a high clutch H/C, a low reverse brake LR/B, a low one-way clutch L/OWC, an a reverse clutch R/C/.

The reverse clutch R/C is connected between front sun gear SF and input shaft 4 to selectively connect the front sun gear $S_F$ with input shaft 4. The 2-4 brake 2-4/B is disposed between front sun gear $S_F$ and a casing to hold front sun gear $S_F$ selectively. The high clutch H/C is connected between front planet carrier $C_F$ and input shaft 4 for selective connection therebetween. The low one-way clutch L/OWC is disposed between front planet carrier $C_F$ and the casing to prevent reverse rotation of the front planet carrier $C_F$ opposite to the rotational direction of the engine. The low reverse brake LR/B is arranged to hold the front planet carrier $C_F$ selectively. The low clutch L/C is connected between front planet carrier $C_F$ and rear ring gear $R_R$ for select connection therebetween. Output shaft 5 is connected with front ring gear $R_F$ and rear planet carrier $C_R$ which are connected together. Rear sun gear $S_R$ is connected with input shaft 4.

Figure 2:
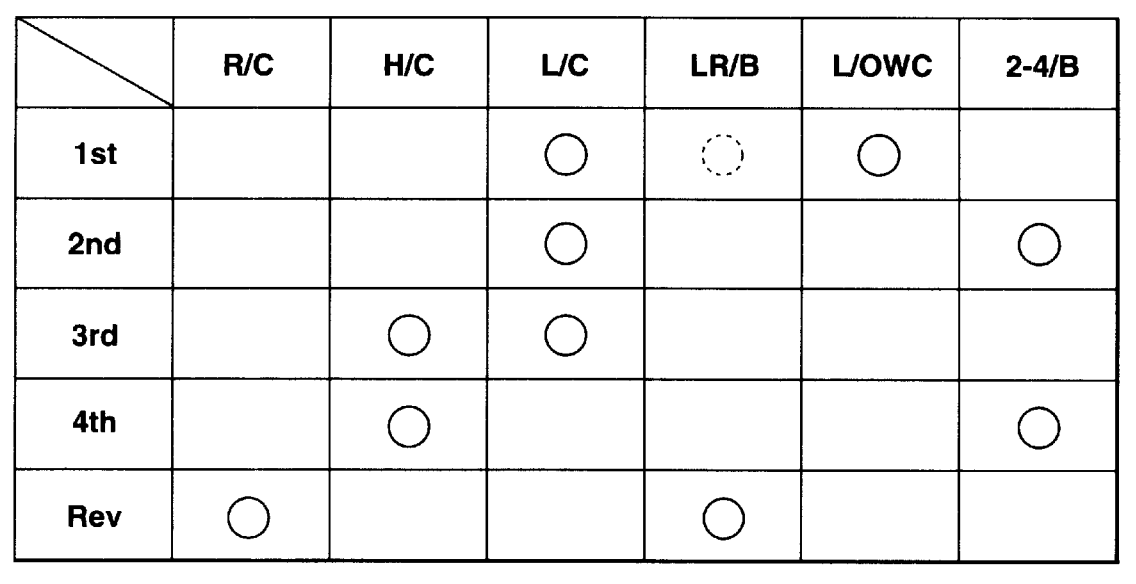

The thus-constructed planetary gear train can provide a first forward speed (1st), a second forward speed (2nd), a third forward speed (3rd), a fourth forward speed (4th) and a reverse speed (Rev), by selective oil pressure actuation (engagement) shown by solid line circles in FIG. 2 of the five friction elements R/C, H/C, L/C, LR/B, and 2-4/B, and self engagement of low one-way clutch L/OWC shown by a solid line circle. A broken circle in FIG. 2 indicates oil pressure actuation 8 (or engagement) to effect engine braking.

A control valve body 8 includes a hydraulic control circuit to achieve the engagement logic shown in FIG. 2, of the shift control friction elements L/C, 2-3/B, H/C, LR/B, and R/C. In addition to manual valve (not shown), the control valve body 8 has a line pressure solenoid 9, a low clutch solenoid 10, a 2-4 speed brake solenoid 11, a high clutch solenoid 12 and a low reverse brake solenoid 13.

The line pressure solenoid 9 changes the line pressure as a source pressure of the shift control between high and low levels by it on and off operation. The manual valve is operated by the driver among a forward drive range position (D), a reverse range position (R), and park and stop range positions (P, N).

In D range, the manual valve supplies the above-mentioned line pressure as a D range pressure to the low clutch solenoid 10, the 2-4 brake solenoid 11, the high clutch solenoid 12 and the low reverse brake solenoid 13. Each of the solenoids 10 to 13 reduces the line pressure directed to the corresponding one of the low clutch L/C, the 2-4 speed brake 2-4/B, the high clutch H/C and the low reverse brake LR/B, in accordance with the solenoid pressure generated by the duty control from the above-mentioned D range pressure. Thus, the solenoids 10 to 13 can regulate the operating fluid pressures of these friction engagement elements individually, and the shift control system can achieve the engagement logic from first gear to fourth gear shown in FIG. 2 by the duty control of solenoids 10 to 13.

In R range, the manual valve delivers the line pressure directed to the reverse clutch R/C independently from the duty control of the solenoids, and supplies the pressure regulated form the line pressure and a source pressure by the corresponding solenoid to the low reverse brake LR/B. Thus, the engagement logic of reverse drive is achieved with the reverse clutch R/C and low reverse brake LR/B.

In P and N ranges, the manual valve is in a state supplying the line pressure to none of the circuits and thereby puts the automatic transmission in a neutral position, by disengaging all the friction elements.

A transmission controller 14 controls the line pressure solenoid 9 in the on/off control mode, and controls the low clutch solenoid 10, 2-4 speed brake solenoid 11, high clutch solenoid 12 and low reverse brake 13 in the duty control mode in accordance with input information supplied form the following input devices.

A throttle opening sensor 15 senses a throttle opening (degree) of the engine 1. A turbine rotational speed sensor (or input rotational speed sensor) 16 senses a turbine rotational speed Nt which is an output rotational speed of the torque converter 3 (i.e., the transmission input rotational speed). An output rotational speed sensor 17 senses a rotational speed No of the output shaft 5 of the automatic transmission 2. An inhibitor switch 18 senses a selected range.

Oil pressure switches 19 are disposed in engage-side friction elements to be engaged in interchange shifts. As shown in FIG. 2, the engage-side friction element is the high clutch H/C in the case of 2-3 shift from 2nd gear speed to 3rd gear speed, the 2-4 brake 2-4/B in the case of 3-2 shift, the 2-4 brake in the case of 3-4 shift, and the low clutch L/C in the case of 4-3 shift. The signals are supplied from the oil pressure switches 19 to the transmission controller 14. In each friction engagement element, the oil pressure switch 19 is turned on when the fluid pressure reaches a pressure level to end a loss stroke and to start producing an engagement capacity. Throughout the present specification, the loss stroke of the friction element to be engaged is a piston stroke before oil pressure generates an engagement capacity.

Hereinafter, there will be discussed the manner of operation of automatic shift in D range in accordance with the present invention.

The transmission controller 14 executes a not-shown control program to retrieve an optimum speed position requested by the present driving condition from a previous store shift map, throttle opening TVO and the transmission output rotational speed No (or vehicle speed). Next, the transmission controller 14 determines whether the present selected speed position corresponds to the optimum speed position. When the present selected speed position does not correspond to the optimum speed position, the transmission controller 14 outputs a shaft command to execute the shift to the optimum speed position. More specifically, the transmission controller 14 executes the duty control of the solenoids 10 to 13 to vary the oil pressures of the friction elements relating to the present shift on the basis of the engagement logic shown in FIG. 2, so that the engagement and disengagement of the friction elements are achieved.

There will be discussed the interchange shift which is executed by disengaging a friction element through decreasing the oil pressure thereof and by engaging the other friction element through increasing the oil pressure thereof. For example, in this embodiment, such interchange shift is executed during the shift between the 2nd speed and the 3rd speed and the shift between the 3rd speed and the 4th speed.

If this interchange shift is executed during an upshift (drive-up shift) that the vehicle speed is increased under the accelerating drive condition in contrast to the engine brake operating condition, the transmission controller 14 provides predetermined patterns to a disengage-side command oil pressure $P_C$ which is a command value of the oil pressure of the friction element to be disengaged and to an engage-side command oil pressure $P_C$ which is a command value of the oil pressure of the friction element to be engaged.

Figure 3:
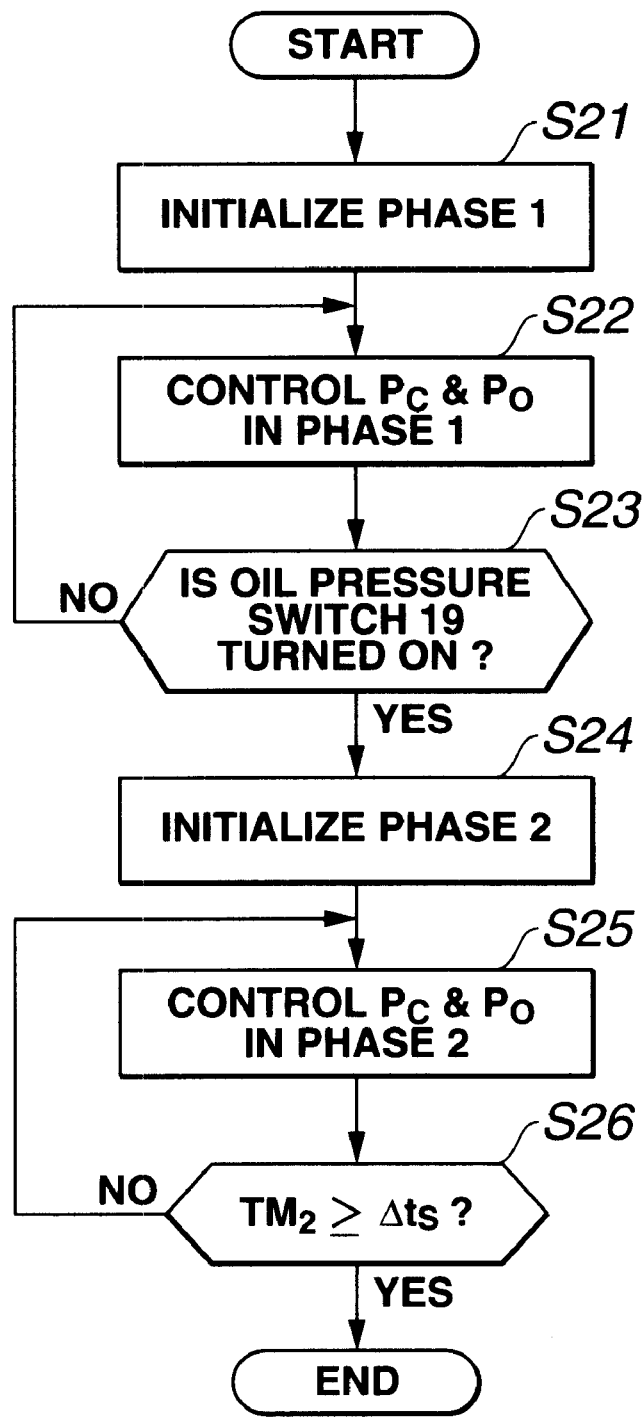
FIG. 3 is a flowchart showing a main routine of the control program of an engage-side command oil pressure and a disengage-side command oil pressure in the case that the shift control system according to the embodiment of the present invention executes an interchange shift of the upshift.

In order to execute this interchange shift, the transmission controller 14 controls the disengage-side command oil pressure $P_O$ and the engage-side command oil pressure $P_C$ in time series on the basis of a flowchart shown in FIG. 3.

Figure 5A:
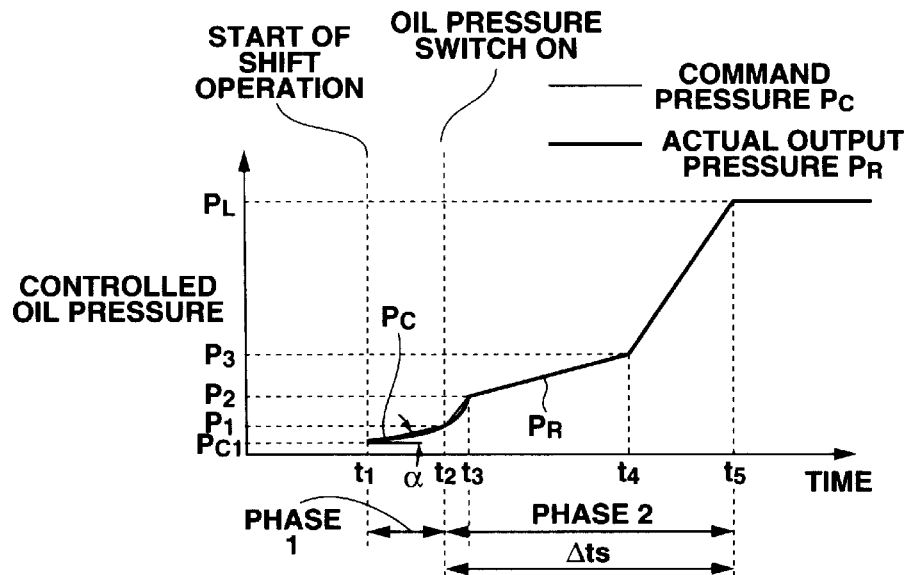
FIGS. 5A, 5B and 5C are time charts of the command pressures of the engage-side and the disengage-side, of a transmission output torque, and a turbine rotational speed during the interchange upshift executed by the automatic transmission according to the first embodiment of the present invention.

At step S21 the transmission controller 14 executes an initialization for Phase 1 from a moment $t_1$ of the shift command to a moment $t_2$ of turn-on of the oil pressure switch 19 of FIG. 5A.

At step S22 the transmission controller 14 determines the disengage-side command oil pressure value $P_O$ and the engage-side command oil pressure value $P_C$ during Phase 1.

At step S23 the transmission controller 14 determines whether the oil pressure switch 19 is turned on or not. That is, it is determined whether or not the engage-side friction element terminates the loss stroke and the pressure state thereof reaches the moment $t_2$ when the engagement capacity of the engage-side friction element starts increasing. Until the moment $t_2$ of FIG. 5A, step S22 is executed to continue the control of the disengage-side command oil pressure value $P_O$ and the engage-side command oil pressure value $P_C$.

When the determination at step S22 is affirmative, the program proceeds to step S24 wherein the transmission controller 14 executes an initialization for Phase 2 from the moment $t_2$ to the moment $t_5$ (corresponding to a period $\Delta ts$).

At step S25 the transmission controller 14 determines the disengage-side command oil pressure value $P_O$ and the engage-side command oil pressure value $P_C$ during Phase 2.

At step S26 the transmission controller 14 determines whether or not a timer $TM_2$ (which starts counting at the moment $t_2$) has already counted the predetermined time period $\Delta ts$, that is, it is determined whether Phase 2 is completed or not. If $TM_2 < \Delta ts$, Phase 2 is not completed and therefore the control of the disengage-side command oil pressure value $P_O$ and the engage-side command oil pressure value $P_C$ is continued. If $TM_2 \geq \Delta ts$, that is, when Phase 2 is terminated, the control of the disengage-side command oil pressure value $P_O$ and the engage-side command oil pressure value $P_C$ is terminated.

Figure 4:
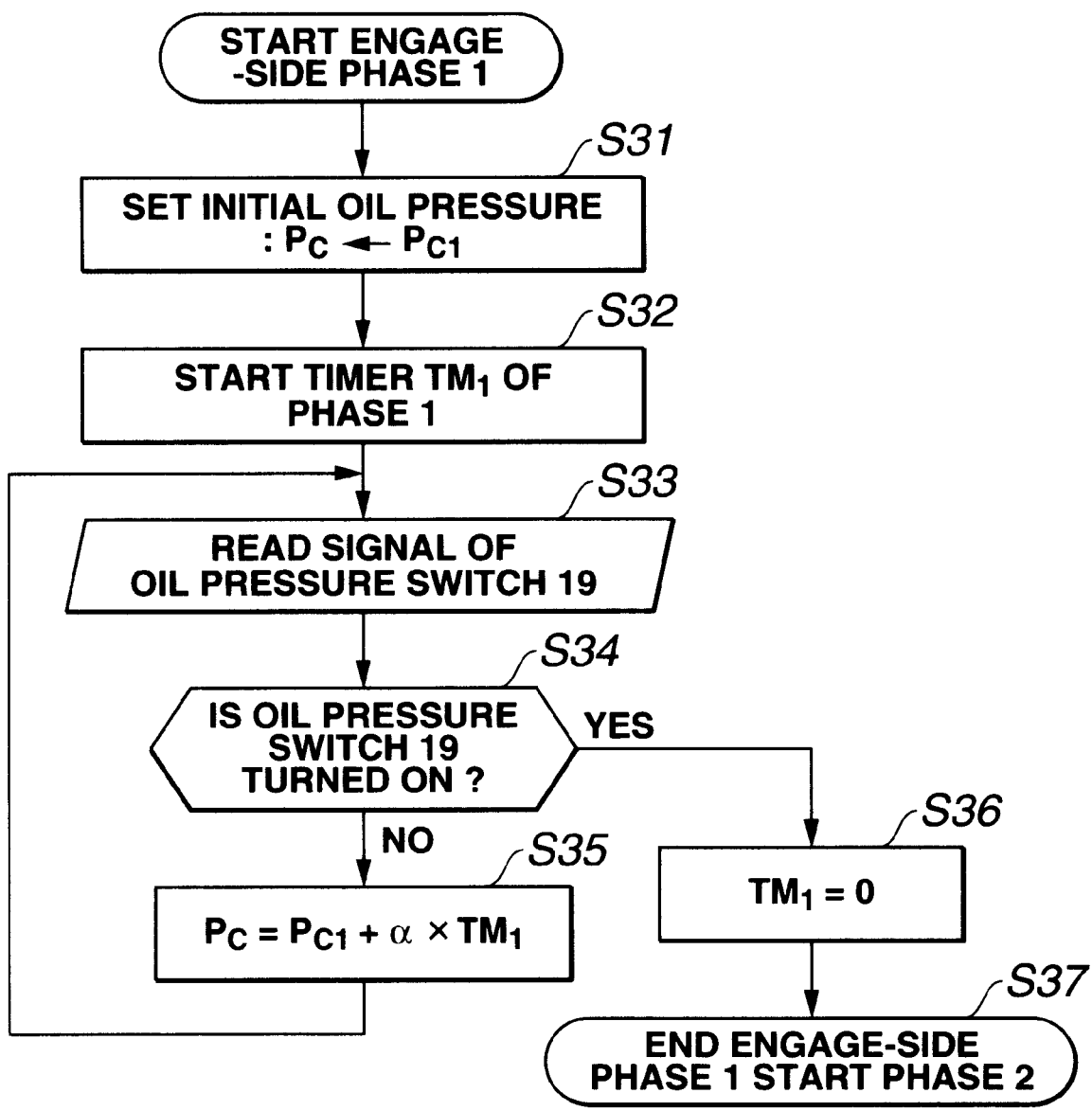
FIG. 4 is a flowchart showing a subroutine of the control program of the engage-side command oil pressure when the interchange upshift in Phase 1 is executed.

FIG. 4 shows the control of the engage-side command oil pressure value PC during Phase 1.

At step S31 the transmission controller 14 set the engage-side command oil pressure value $P_C$ at an initial oil pressure $P_{C1}$ ($P_C \leftarrow P_{C1}$). The initial oil pressure PC1 is set at a smallest value during the start of the loss stroke in order to terminate the loss stroke of the engage-side friction element as quickly as possible.

At step S32 the transmission controller 14 starts a timer $TM_1$ for counting an elapsed time (an elapsed time from the start of Phase 1) from the shift command moment $t_1$ in FIG. 5A.

At step S33 the transmission controller 14 reads a signal outputted from the oil pressure switch 19.

At step S34 the transmission controller 14 determines on the basis of the signal read at step S33 whether or not the oil pressure switch 19 is put in the ON state. More specifically, it is determined whether or not the state of the engage-side friction element reaches the moment $t_2$ of FIG. 5A. When the determination at step S34 is negative, the program proceeds to step S35. When the determination at step S34 is affirmative, the program proceeds to step S36.

At step S35 the transmission controller 14 calculates the engage-side command oil pressure PC from $P_C = P_{C1} + \alpha \times TM_1$ in order that the engage-side command oil pressure PC increases from the initial oil pressure $P_{C1}$ by a predetermined gradient $\alpha$. This gradient $\alpha$ is set at a value by which a difference between the engage-side command oil pressure $P_C$ and an actual output pressure such as an oil pressure $P_R$ applied to the engage-side friction element is generally kept constant.

When the determination at step S34 is affirmative, the program proceeds to step S36 wherein the control at the moment $t_2$ of FIG. 5A is started. Therefore, at step S36 the transmission controller 14 resets the timer $TM_1$ ($TM_1 = 0$).

At step S37 the transmission controller 14 terminates the control of the engage-side command oil pressure PC during Phase 1, and starts the control of the engage-side command oil pressure $P_C$ during Phase 2.

Since a procedure of controlling the pressure of a disengage-side friction element during Phase 1 and a procedure of controlling the pressures of the disengage-side and the engage-side friction elements during Phase 2 are generally the same as conventional procedures, the explanation thereof is omitted in this first embodiment.

Figure 5B:
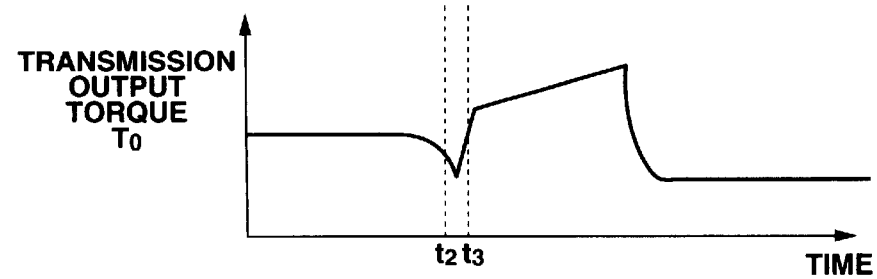
Figure 5C:
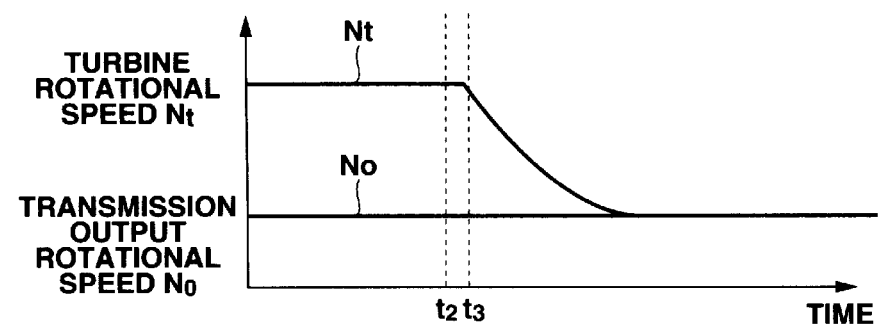

FIGS. 5A to 5C show the control of the oil pressure of the engage-side friction element during the interchange shift operation on the basis of the above-mentioned procedure. As shown by a thin line in FIG. 5A, at the moment $t_1$ the engage-side command oil pressure $P_C$ is increased from the initial pressure $P_{C1}$ by the predetermined gradient $\alpha$, and this control is continued-in Phase 1 until the moment $t_2$ when the oil pressure switch 19 is turned on.

Figure 6A:
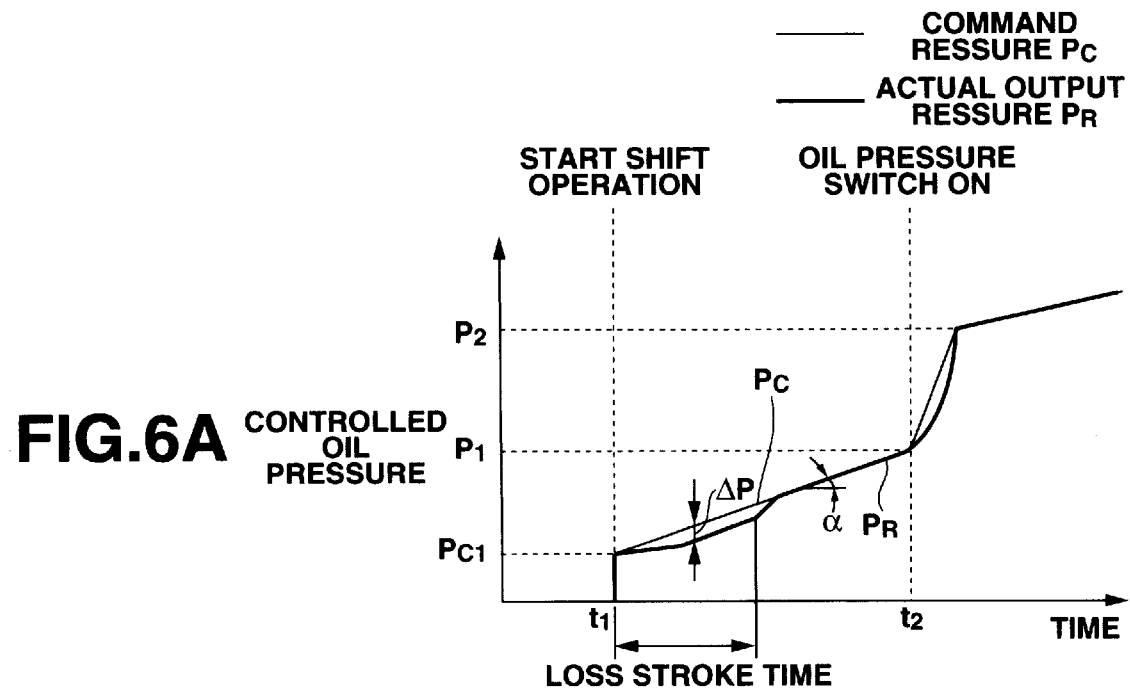
FIGS. 6A and 6B are enlarged time charts of two patterns during Phase 1 of FIG. 5A.
Figure 6B:
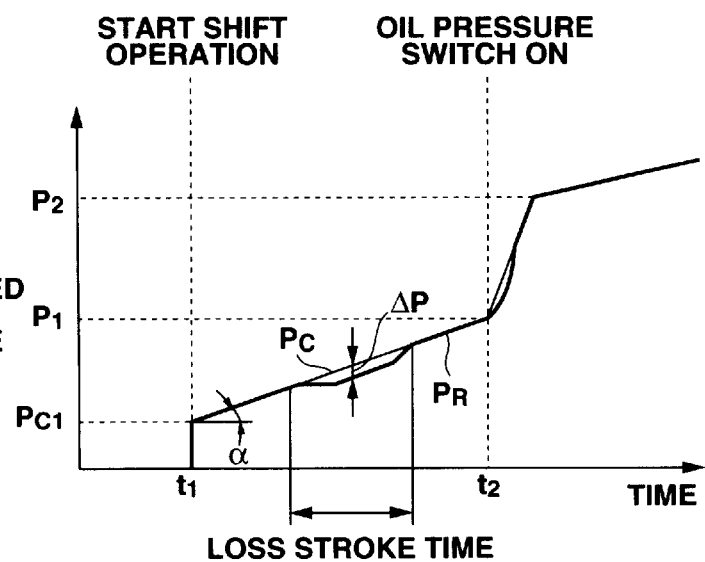

FIGS. 6A and 6B show enlarged part during Phase 1 from the moment $t_1$ to the moment $t_2$. More specifically, FIG. 6A shows a graph in a case that the actual output pressure at the start and the end of the loss stroke is relatively small. FIG. 6B shows a graph in a case that the actual output pressure at the start and the end of the loss stroke is relatively large. As is clear from FIGS. 6A and 6B, during the loss stroke, the engage-side command oil pressure $P_C$ (shown by thin line) is increased by the predetermined gradient so that the difference between the engage-side command oil pressure $P_C$ and the actual oil pressure $P_R$ (shown by thick line) of the engage-side friction element is kept at a small value $\Delta P$. As a result of this control, it becomes possible to prevent the actual pressure $P_R$ of the engage-side friction element from generating serge pressure.

Figure 7:
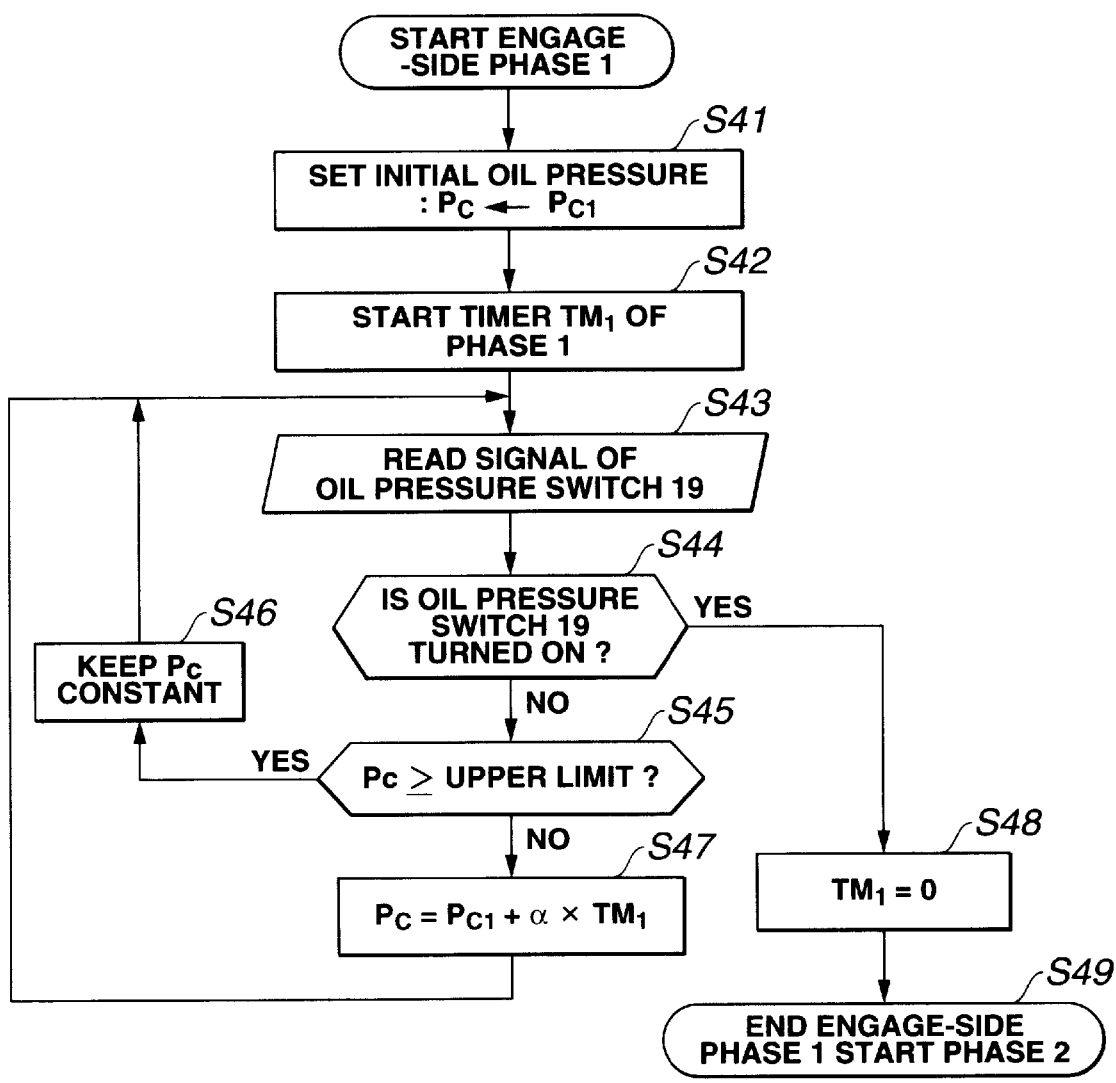
FIG. 7 is a flowchart showing another subroutine of the control program of the engage-side command oil pressure when the interchange upshift in Phase 1 is executed.

FIG. 7 shows a modification of the control of the engage-side command oil pressure Pc during Phase 1.

Steps S41 to S44 of the flowchart in FIG. 7 are the same as those of steps S31 to S34 of the flowchart of FIG. 4.

The control of the second embodiment comprises a step S45 wherein the transmission controller 14 checks whether the engage-side command oil pressure $P_C$ is greater than or equal to a predetermined upper limit. When the determination at step S45 is affirmative, the program proceeds to step S46 wherein the command oil pressure $P_C$ is kept at the upper limit $P_{LM}$. When the determination at step S45 is negative, the program proceeds to step S47 corresponding to the step S35 in FIG. 3. That is, the engage-side command oil pressure $P_C$ kept within the upper limit until the oil pressure switch 19 is turned on. The predetermined upper limit $P_{LM}$ is previously set to range from the oil pressure $P_1$ at the end of the loss stroke to a value slightly greater than $P_1$. More specifically, the range of the predetermined upper limit $P_{LM}$ is represented by the following expression (1).

$$P_1 < P_{LM} < P_1 + \Delta P_M \qquad (1)$$

where $\Delta P_M \leq 50$ kPa. This range is determined upon taking account of the deviation of the characteristics of the oil pressure switch by each shift control system.

Figure 8:
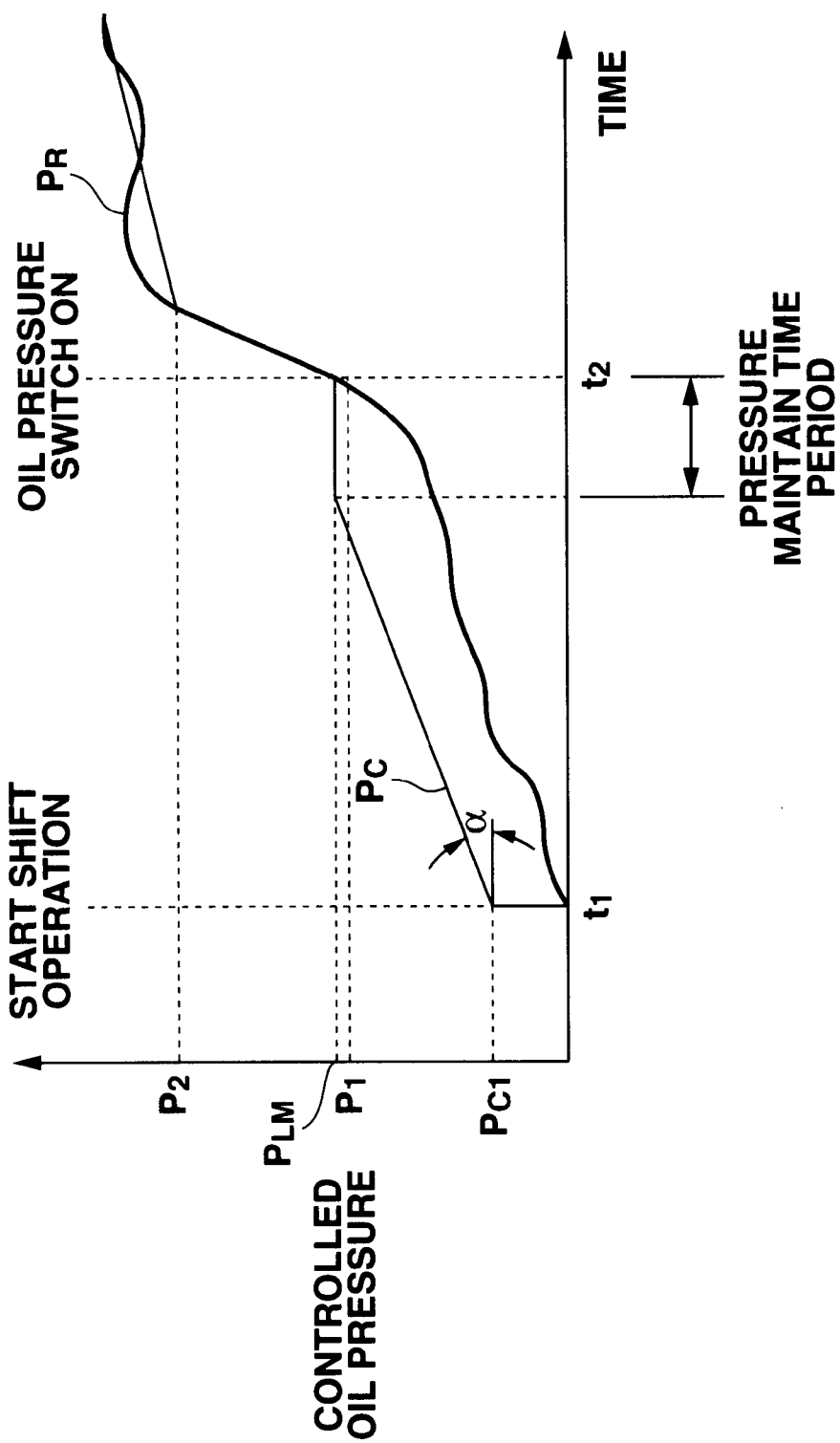
FIG. 8 is a time chart of the engage-side command oil pressure in Phase 1, controlled based on the control program of FIG. 7.

FIG. 8 shows the time chart of the controlled oil pressure of the engage-side friction element during Phase 1 of the interchange shift. As shown in FIG. 8, at the moment $t_1$ the engage-side command oil pressure $P_C$ shown by thin line in FIG. 8 is increased from the initial pressure $P_{C1}$ by the predetermined gradient $\alpha$ until the moment $t_2$ when the oil pressure switch 19 is turned on during Phase 1. As shown in FIG. 8, if the engage-side command oil pressure $P_C$ reaches the upper limit $P_{LM}$ during Phase 1, the loss stroke is terminated at this moment and the engage-side command oil pressure $P_C$ is kept at the upper limit $P_{LM}$ until the moment $t_2$ when the oil pressure switch is turned on. This control prevents the actual output pressure from generating serge pressure.

By executing the above mentioned control, the disengage-side friction element is disengaged and the engage-side friction element is engaged according to the time-series decrease of the disengage-side command oil pressure $P_O$ and the time-series increase of the engage-side command oil pressure $P_C$ so that the interchange between the engage-state and the disengage-state is smoothly executed, and at last the interchange shift is achieved.

In this embodiment, during the control of the engage-side command oil pressure $P_C$ in Phase 1 for the interchange shift operation, the initial pressure at the start of the shift is set at the minimum value at the end of the loss stroke and the engage-side command oil pressure $P_C$ is increased by the predetermined gradient $\alpha$ while being controlled so that the difference between the command pressure Pc and the actual output pressure $P_R$ of the engage-side friction element is kept at the small value $\Delta P$.

As a result, it becomes possible to prevent the generation of serge pressure at the end of the loss stroke. Accordingly, as is clear from the time-series change of the transmission output torque shown in FIG. 5B, it becomes possible to suppress the drop of the torque and to prevent the generation of racing of the engine or the generation of pushing-up shock following the racing. Therefore, the shift control system according to the present invention realizes a smooth shift operation.

Referring to FIGS. 9 to 17, there is shown a second embodiment of the shift control system according to the present invention. The second embodiment has a construction basically the same as that of the first embodiment shown in FIG. 1 and executes a shift operation based on the engagement logic shown in FIG. 2. Therefore, the explanation thereof is omitted herein.

Figure 9:
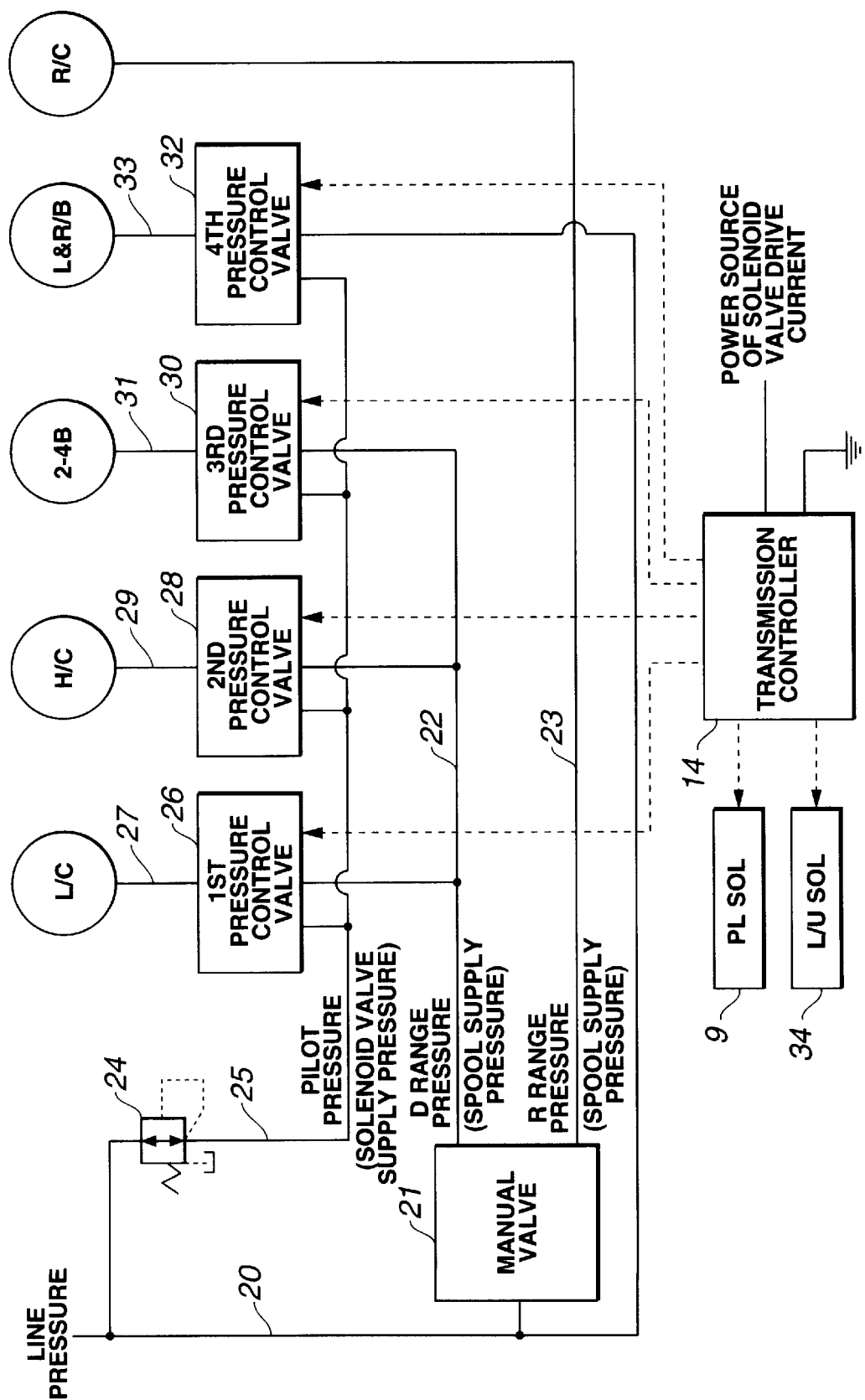
FIG. 9 is a schematic view showing an oil pressure control system of the automatic transmission in a second embodiment according to the present invention.

In this second embodiment, the elements in the oil pressure control system are disclosed in more detail as compared with those of the first embodiment. FIG. 9 shows an oil pressure control system of the shift control system of the second embodiment, which is basically the same as that shown in FIG. 1.

A line-pressure oil passage 20 is arranged to supply a line pressure to a manual valve 21, a pilot valve 24 and a fourth pressure control valve 32. A D-range pressure oil passage 22 connects the manual valve 21 with the first, second and third pressure control valves 26, 28 and 30. A R-range pressure oil passage 23 connects the manual valve 21 with the reverse clutch R/C.

The manual valve 21 varies its position according to the driver's shift operation. In D range, the line pressure oil passage 20 is connected with the D-range oil pressure passage 22, and in R range the line pressure oil passage 20 is connected with the R-range oil pressure passage 23.

A pilot valve 24 is connected with first to fourth pressure control valve 26, 28, 30 and 32 through a pilot pressure passage 25 and functions to decrease the line pressure of the line pressure passage 20 at a constant pilot pressure. The first pressure control valve 26 includes a low-clutch amplifier valve and the low-clutch solenoid 10. The first pressure control valve 26 generates the low-clutch pressure from the D-range pressure and supplies the low-clutch pressure to the low clutch L/C through a low-clutch oil passage 27 according to a control signal from the transmission controller 14. The second pressure control valve 28 includes a high-clutch amplifier valve and the high-clutch solenoid 12. The second pressure control valve 26 generates the high-clutch pressure from the D-range pressure and supplies the high-clutch pressure to the high clutch H/C through a high-clutch oil passage 29 according to a control signal from the transmission controller 14. The third pressure control valve 30 includes a 2-4 brake amplifier valve and the 2-4 brake solenoid 11. The third pressure control valve 30 generates the 2-4 brake pressure from the D-range pressure and supplies the 2-4 brake pressure to the 2-4 brake 2-4/B through a 2-4 brake oil passage 31 according to a control signal from the transmission controller 14. The fourth pressure control valve 32 includes a low reverse brake amplifier valve and the low reverse brake solenoid 13. The fourth pressure control valve 32 generates the low reverse brake pressure from the D-range pressure and supplies the low reverse brake pressure to the low reverse brake LR/B through the low reverse brake oil passage 33 according to a control signal from the transmission controller 14. Further, a lockup solenoid 34 is arranged to control the engagement and disengagement of the lockup clutch according to a command signal from the transmission controller 14.

Figure 10:
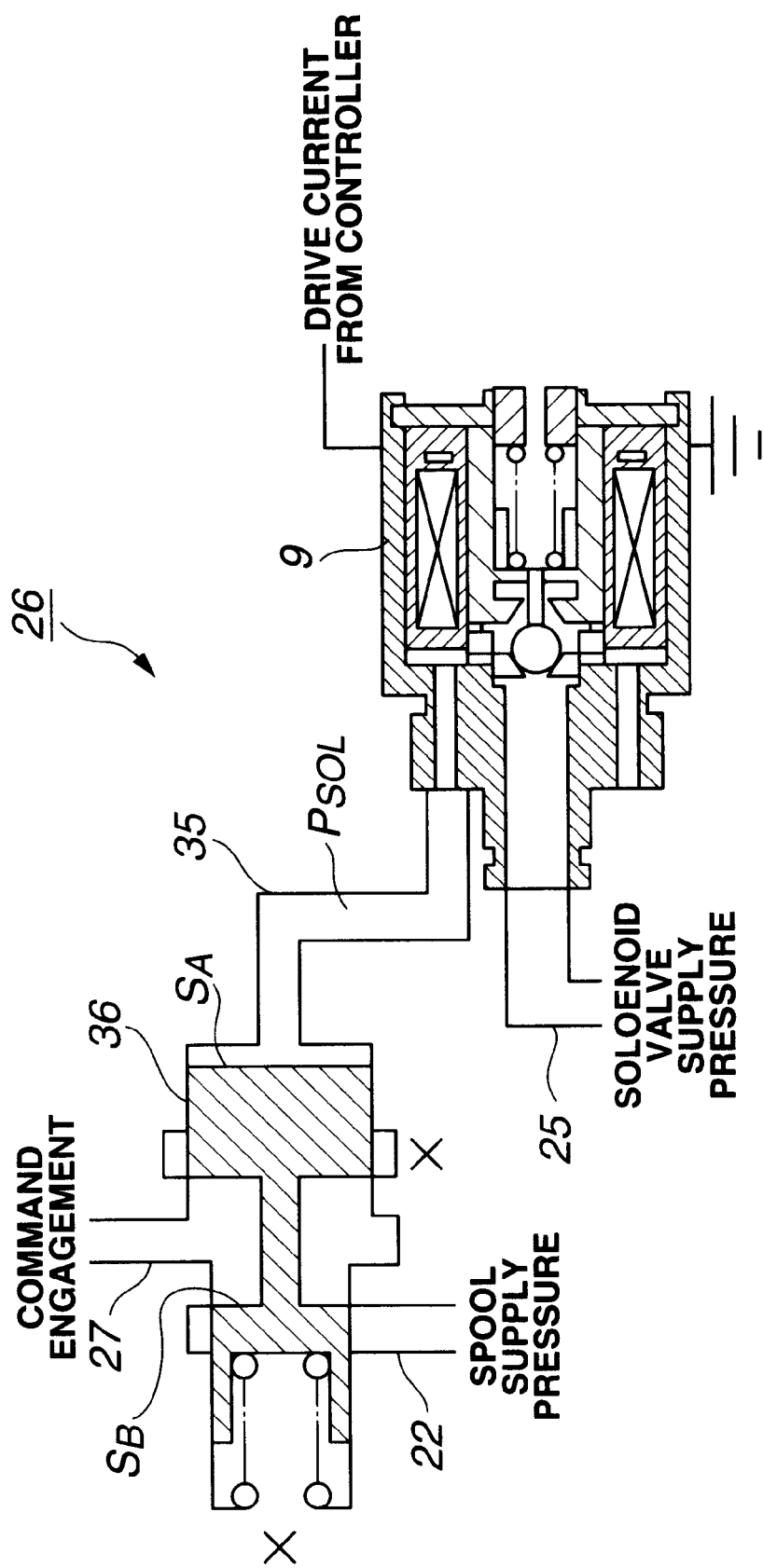
FIG. 10 is a view showing a structure of a pressure control valve shown in FIG. 9.

FIG. 10 shows a structure of the first pressure control valve 26. The first pressure control valve 26 comprises the solenoid valve 9 which controls the solenoid valve supply pressure (pilot pressure) at a spool supply pressure by means of the duty control (pulse width modulation control method) for applying duty drive current to the solenoid coil, a spool signal pressure oil passage 35, and a spool valve 36 which controls the D-range pressure at the low clutch pressure by using the oil pressure of the spool signal pressure oil passage 35.

Figure 11:
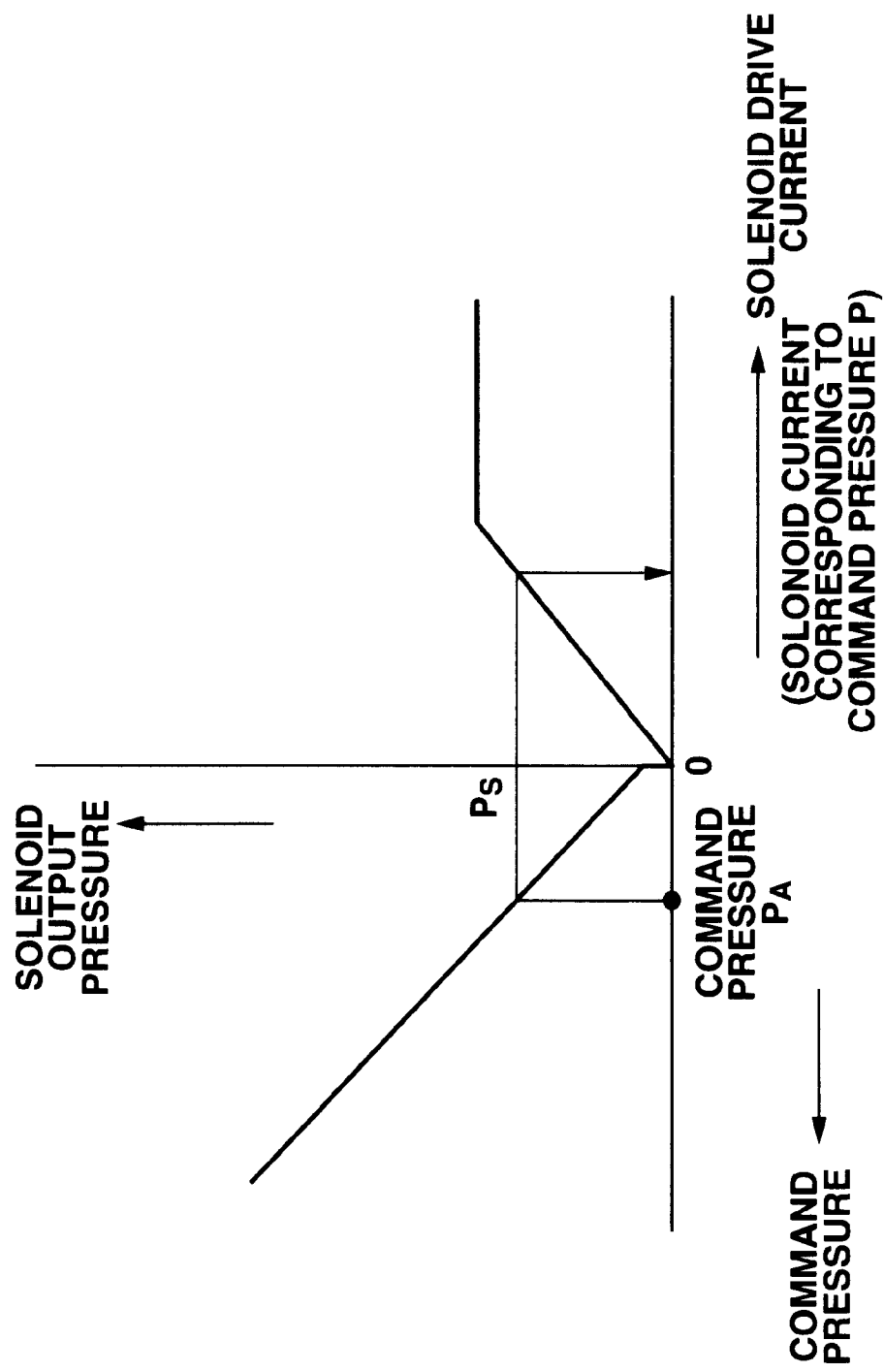
FIG. 11 is a graph showing a characteristic of the pressure control valve shown in FIG. 9.

FIG. 11 is a graph showing characteristics of the solenoid drive current, the solenoid output pressure and the solenoid command pressure of the solenoid valve. This solenoid valve outputs the oil pressure PS according to the drive current which corresponds to the command pressure PA calculated by the transmission controller 14 and is outputted to the solenoid valve.

The shift control system of the second embodiment according to the present invention executes the automatic shift in D range by the same manner described in the first embodiment. Therefore, the explanation of the manner of operation of automatic shift in D range is basically omitted, and only the subroutines as to the disengage-side pressure control in Phase 1 shown in FIG. 12 and as to the disengage-side and engage-side pressure controls in Phase 2 in FIGS. 13 and 14 will be discussed herein.

The shift control system of the second embodiment executes an interchange shift as is basically the same as that executed in the first embodiment. That is, the-transmission controller 14 of the second embodiment executes the duty control of the solenoids 10 to 13 to vary the oil pressures of the friction elements relating to the present shift on the basis of the engagement logic shown in FIG. 2, so that the engagement and disengagement of the friction elements are achieved.

When this interchange shift is executed during an upshift that the vehicle speed is increased under the accelerating drive condition (in contrast to the engine brake operating condition), the transmission controller 14 provides predetermined patterns to a disengage-side command oil pressure $P_C$ which is a command value of the oil pressure of the friction element to be disengaged and to an engage-side command oil pressure $P_C$ which is a command value of the oil pressure of the friction element to be engaged.

In order to execute this interchange shift, the transmission controller 14 controls the disengage-side command oil pressure $P_O$ and the engage-side command oil pressure $P_C$ in time series. This control operation is the same as the control shown by the flowchart of FIG. 3 explained in the first embodiment. Therefore, the explanation of the interchange shift shown in FIG. 3 is omitted herein.

Further, as discussed by the modification of the first embodiment, in the second embodiment, the engage-side command oil pressure $P_C$ is kept within the upper limit until the oil pressure switch 19 is turned on. The predetermined upper limit $P_{LM}$ is previously set to range from the oil pressure $P_1$ at the end of the loss stroke to a value slightly greater than $P_1$. More specifically, the range of the predetermined upper limit $P_{LM}$ is represented by the following expression (1).

$$P_1 < P_{LM} < P_1 + \Delta P_M \quad (1)$$

where $\Delta P_M \leq 50$ kPa. This range is determined upon taking account of the deviation of the characteristics of the oil pressure switch by each shift control system.

Figure 12:
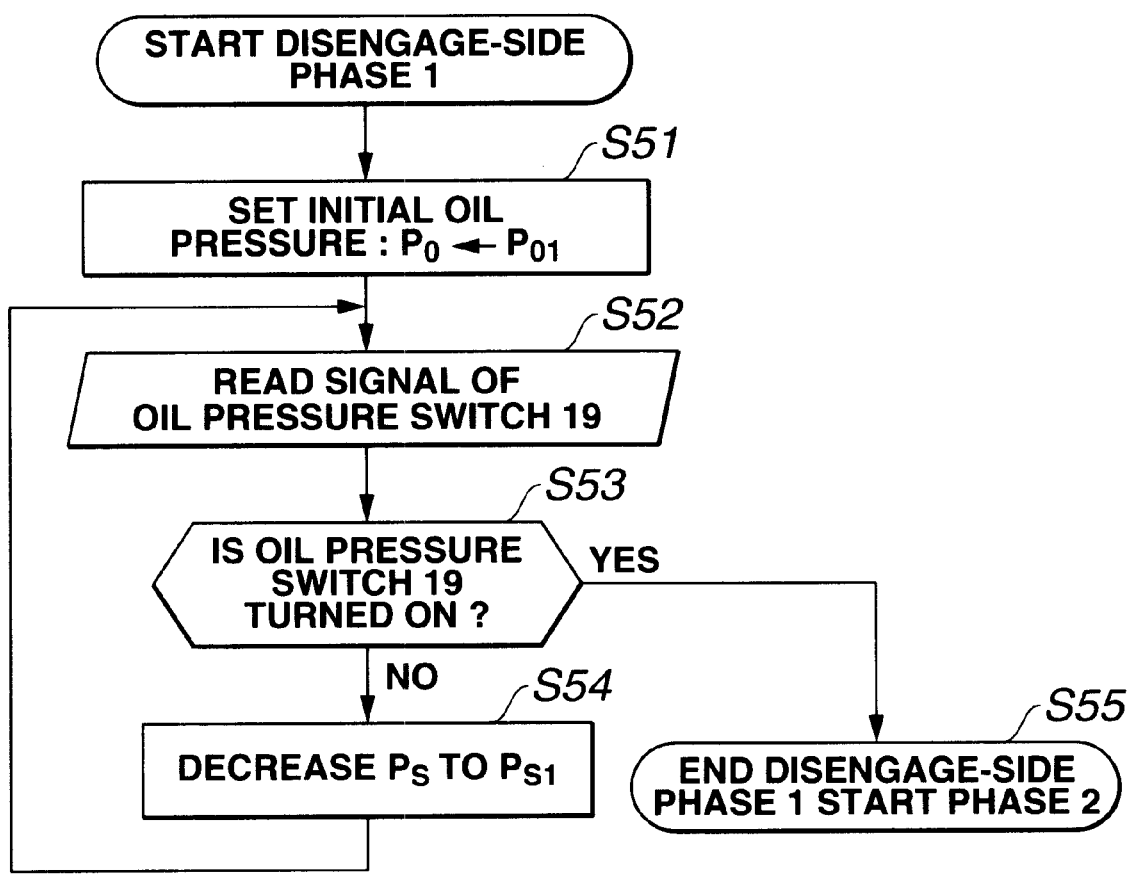
FIG. 12 is a flowchart showing a subroutine of the control program of the disengage-side command oil pressure when the interchange upshift in Phase 1 is executed by the second embodiment.

With reference to a flowchart of FIG. 12, the control of the disengage-side command oil pressure $P_O$ in Phase 1 will be discussed.

At step S51 the transmission controller 14 sets an initial pressure relating to the disengage-side command oil pressure $P_O$ ($P_O \leftarrow P_{O1}$).

At step S52 the transmission controller 14 reads a signal outputted from the oil pressure switch 19.

At step S53 the transmission controller 14 determines on the basis of the signal read at step S52 whether or not the oil pressure switch 19 is put in the ON state. More specifically, it is determined whether or not the state of the engage-side friction element reaches the moment $t_2$ of FIG. 15A. When the determination at step S53 is negative, the program proceeds to step S54. When the determination at step S53 is affirmative, the program proceeds to step S55.

At step S54 the transmission controller 14 outputs a command for decreasing the disengage-side command oil pressure $P_O$ to a set value $P_6$. Then, the program returns to step S52 to repeat steps S53 and S53 until the determination at step S53 turns to affirmative decision.

At step S55 the transmission controller 14 terminates the control of the disengage-side command oil pressure $P_O$ in Phase 1 and starts the control in Phase 2. Accordingly, the transmission controller 14 starts the control of the disengage-side command oil pressure $P_O$ in Phase 2.

The control of the engage-side command oil pressure $P_C$ in Phase 1 is basically as same as the control shown by the flowchart of FIG. 4 in the first embodiment,and therefore the explanation thereof is omitted herein.

Figure 13:
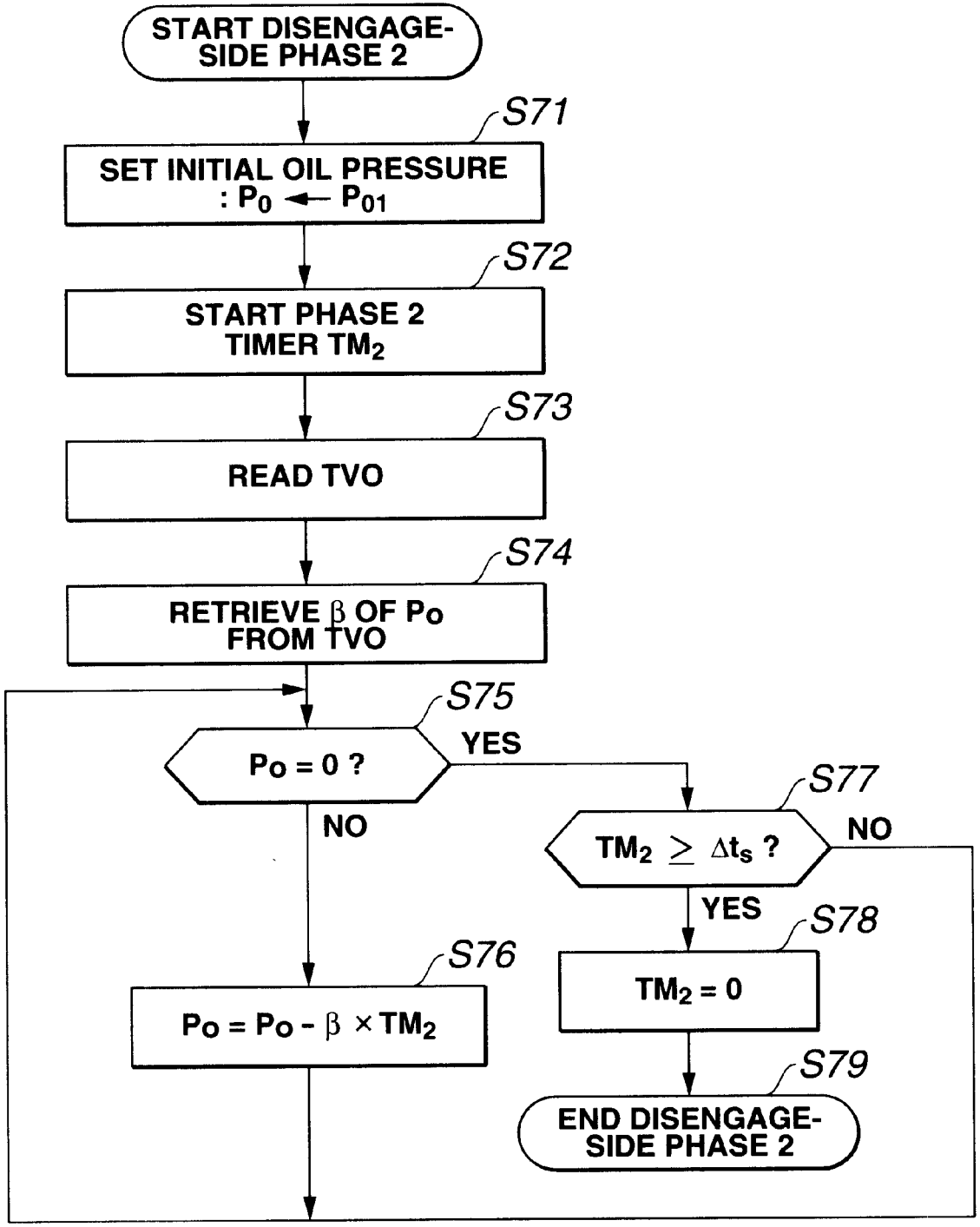
FIG. 13 is a flowchart showing a subroutine of the control program of the disengage-side command oil pressure when the interchange upshift in Phase 2 is executed by the second embodiment.

Next, the control of the disengage-side command oil pressure $P_O$ in Phase 2 will be discussed with reference to a flowchart of FIG. 13.

At step S71 the transmission controller 14 initializes an initial pressure relating to the disengage-side command oil pressure $P_O$. The value of the initial pressure in FIG. 15A takes $P_6$.

At step S72 the transmission controller 14 starts counting a timer $TM_2$ for measuring an elapsed time from a moment $t_2$ of a turn-on of the oil pressure switch 19 in FIG. 16A. That is, the transmission controller 14 counts an elapsed time period from the start of Phase 2.

As step S73 the transmission controller 14 reads the throttle opening TVO.

At step S74 the transmission controller 14 retrieves a gradient β from a map showing a relationship (not shown) between the throttle opening TVO and the gradient β of the disengage-side command oil pressure $P_O$, and the read throttle opening TVO.

At step S75 the transmission controller 14 determines whether the disengage-side command oil pressure $P_O$ reaches zero or not. When it is determined at step S75 that the disengage-side command oil pressure $P_O$ is greater than zero, the program proceeds to step S76. When it is determined at step S75 that the disengage-side command oil pressure $P_O$ reaches zero, the program proceeds to step S77.

At step S76 following the negative decision at step S75, the transmission controller 14 calculates the disengage-side command oil pressure $P_O$ from the expression $P_O \leftarrow P_O - \beta \times TM_2$ so as to decrease the disengage-side command oil pressure $P_O$ by a predetermined gradient from the initial pressure as shown in FIG. 16A. During a period from the moment $t_2$ to the moment $t_4$ the gradient β is set at $\beta_1$ (β=$\beta_1$), and during a period from the moment $t_4$ to the moment t5 the gradient β is set at $\beta_2$ (β=$\beta_2$).

At step S77 following the affirmative decision at step S75, the transmission controller 14 determines whether the timer $TM_2$ for measuring an elapsed time period from the start of Phase 2 is greater than a preset time period $\Delta t_s$ employed for determining the end of the shift. When it is determined at step S75 that $TM_2 < \Delta t_s$, the program returns to the step S75. That is, until $TM_2 \geq \Delta t_s$, the disengage-side command oil pressure $P_O$ is kept at zero. When it is determined at step S75 that $TM_2 \geq \Delta t_s$, the program proceeds to step S78 wherein the timer $TM_2$ is reset ($TM_2=0$).

At step S79 following the execution of the step S78, the transmission controller 14 terminates the control of the disengage-side command oil pressure $P_O$ in Phase 2. Accordingly, the disengage-side command oil pressure $P_O$ in Phase 2 is decreased such that the set pressure $P_O$ in Phase 1 is decreased by the predetermined gradients β (β1 and β2), and at last reaches zero. That is, the engagement capacity of the disengage-side friction element is gradually decreased.

Figure 14:
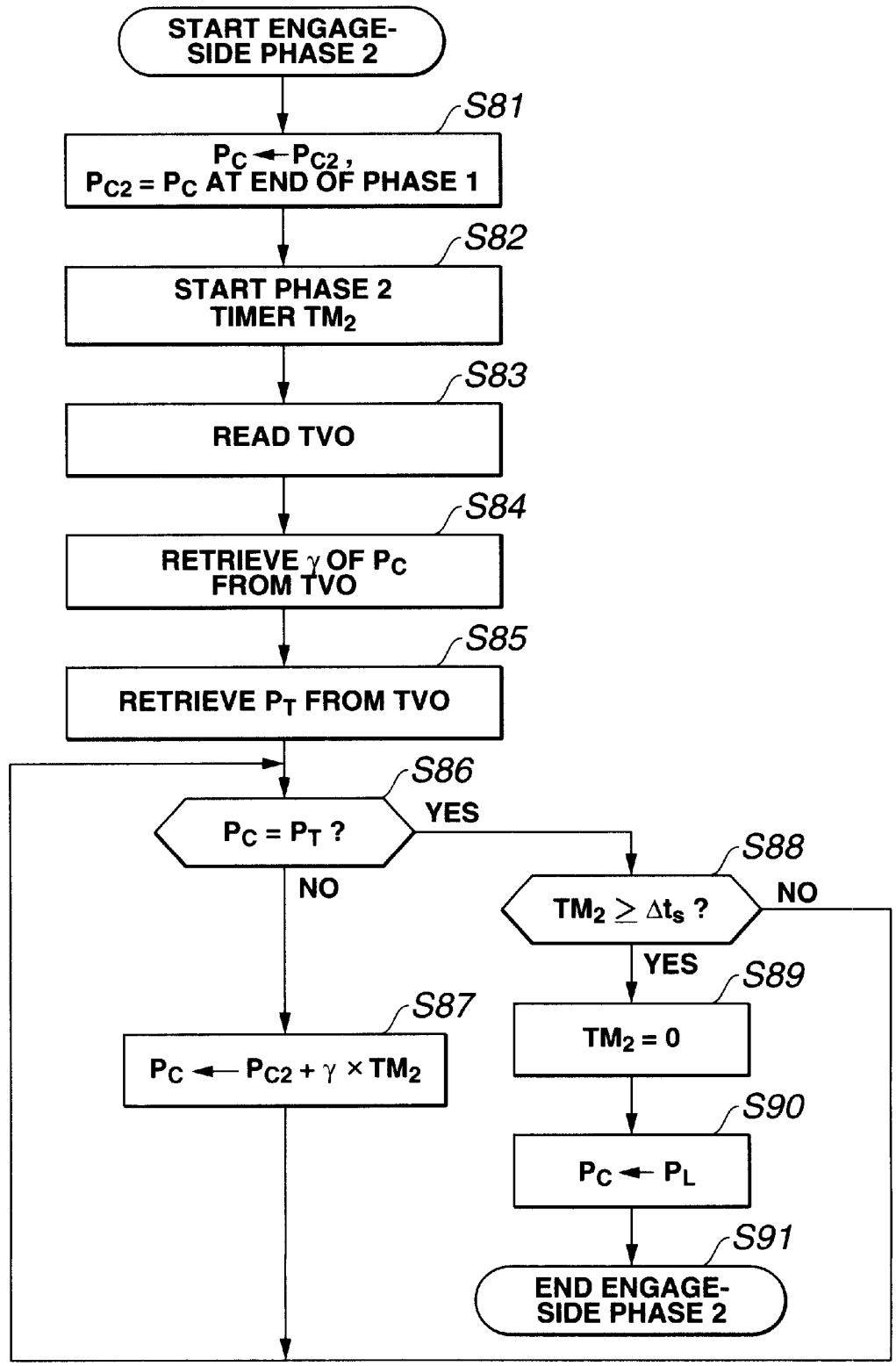
FIG. 14 is a flowchart showing a subroutine of the control program of the engage-side command oil pressure when the interchange upshift in Phase 2 is executed by the second embodiment.

Next, with reference to the flowchart of FIG. 14 the control of the engage-side command oil pressure $P_C$ in Phase 2 will be discussed.

At step S81 the transmission controller 14 sets the initial oil pressure $P_{C2}$ of the engage-side command oil pressure $P_C$. The initial oil pressure $P_{C2}$ is set as the engage-side command oil pressure $P_C$ at the moment $t_2$ in FIG. 15A when the loss stroke of the engage-side friction element is terminated and the pressure switch 19 is turned on. That is, it is set at $P_2$ in FIG. 15A.

At step S82 the transmission controller 14 starts the timer $TM_2$ for measuring the elapsed time period from the moment $t_2$ when the oil pressure switch 19 is turned on.

At step S83 the transmission controller 14 reads the throttle opening TVO from the throttle opening sensor 15.

At step S84 the transmission controller 14 retrieves a gradient γ from a map showing a relationship (not shown) between the throttle opening TVO and the gradient γ of the engage-side command oil pressure $P_C$, and the read throttle opening TVO.

At step S85 the transmission controller 14 retrieves a threshold pressure $P_T$ corresponding to the gradient γ from the throttle opening TVO. The threshold pressure $P_T$ is set at a value by which the inertia phase is terminated within a short time period where no shift shock is generated.

At step S86 the transmission controller 14 determines whether the engage-side command oil pressure $P_C$ is increased to the threshold pressure $P_T$ or not. When it is determined at step S86 that the engage-side command oil pressure $P_C$ is smaller than the threshold pressure $P_T$, the program proceeds to step S87. When it is determined at step S86 that the engage-side command oil pressure $P_C$ reaches the threshold pressure $P_T$, the program proceeds to step S88.

At step S87 following the negative decision at step S86, the transmission controller 14 calculates the engage-side command oil pressure $P_C$ from the expression $P_C \leftarrow P_{C2}+\gamma \times TM_2$ so as to increase the engage-side command oil pressure $P_C$ by a predetermined gradient from the initial pressure $P_{C2}$ ($P_3$) as shown in FIG. 16A. During a period from the moment $t_2$ to the moment $t_6$ the gradient γ is set at $\gamma_1$ ($\gamma=\gamma_1$), and during a period from the moment $t_6$ to the moment $t_7$ the gradient γ is set at $\gamma_2$ ($\gamma=\gamma_2$).

At step S88 following the affirmative decision at step S86, the transmission controller 14 determines whether the timer $TM_2$ for measuring an elapsed time period from the start of Phase 2 is greater than a preset time period $\Delta t_s$ employed for determining the end of the shift. When it is determined at step S88 that $TM_2 < \Delta t_s$, the program returns to the step S86. That is, until $TM_2 \geq \Delta t_s$, the engage-side command oil pressure $P_C$ is kept at the threshold pressure $P_T$. When it is determined at step S88 that $TM_2 \geq \Delta t_s$, the program proceeds to step S89 wherein the timer $TM_2$ is reset ($TM_2=0$).

At step S90 following the execution of the step S89, the transmission controller 14 sets the engage-side command oil pressure $P_C$ at the maximum value as same as the line pressure $P_L$ which is the base pressure of the command oil pressure $P_C$.

At step S91 the transmission controller 14 terminates the control of the engage-side command oil pressure $P_C$ in Phase 2.

With the time-series decrease of the disengage-side command oil pressure $P_O$ and the time-series engage-side command oil pressure $P_C$ as mentioned above, the disengage-side friction element is disengaged and the engage-side friction element is engaged to establish the interchange therebetween, and therefore the predetermined interchange shift is executed.

Since the turning on of the oil pressure switch 19 is employed as a trigger of the controls of the time-series disengage-side command oil pressure $P_C$ and the time-series engage-side command oil pressure $P_O$ and the turn-on pressure of the oil pressure switch 19 acting as detecting the termination of the loss stroke of the engage-side friction element is set slightly greater than the actual pressure during the termination of the loss stroke of the engage-side friction element, the oil pressure control is executed from when the engagement capacities of the engage-side friction element and the disengage-side friction element are small.

Figure 15A:
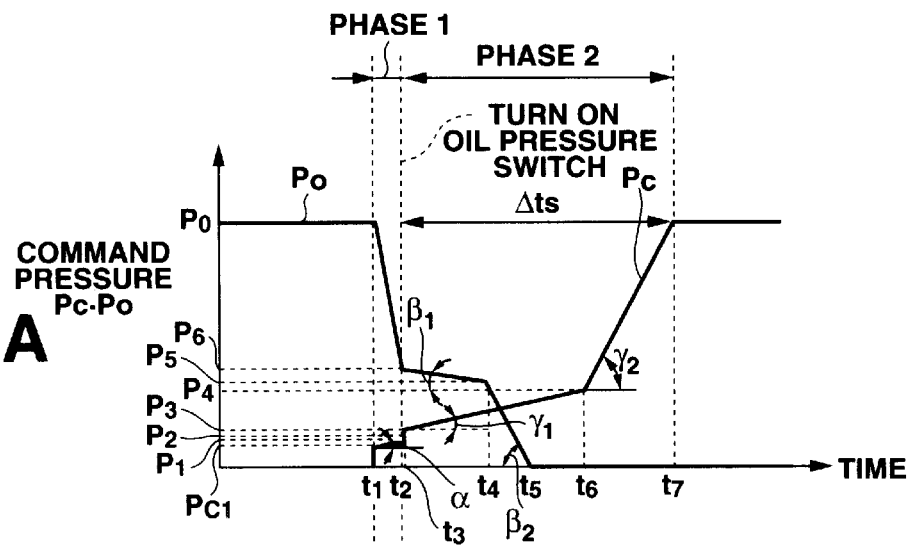
FIGS. 15A, 15B and 15C are time charts of the command pressures of the engage-side and the disengage-side, a transmission output torque, and a turbine rotational speed during the interchange upshift executed by the automatic transmission according to the second embodiment of the present invention.
Figure 15B:
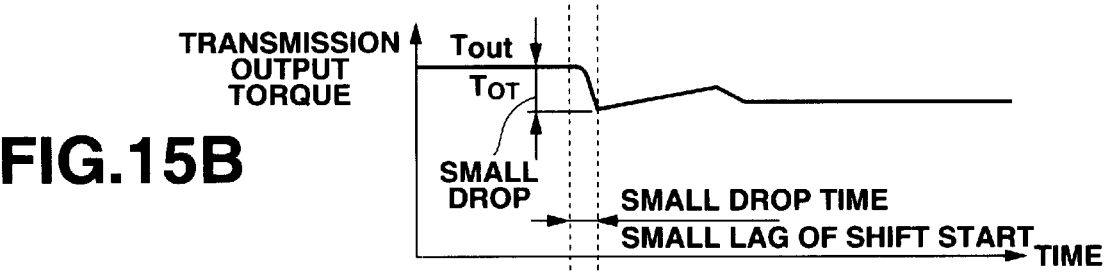
Figure 15C:
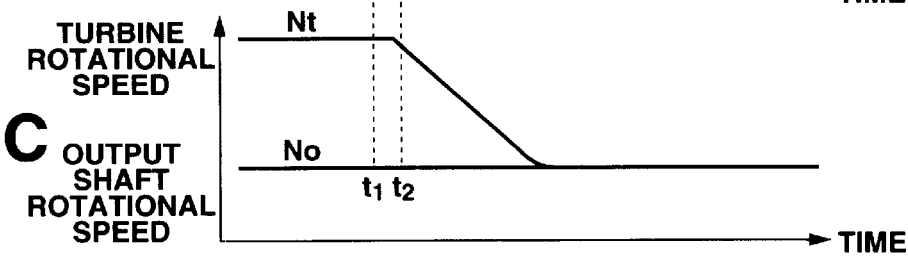

Therefore, as is clear from the time-series change of the transmission output torque $T_{OUT}$ shown in FIG. 15B, it is possible to decrease the drop $T_{OT}$ of the torque and to shorten the drop time thereof. As a result, it becomes possible to prevent the generation of the racing, the generation of the torque shock thereby, and the generation of backlash noise between gears of the gear transmission mechanism of the automatic transmission.

Referring to FIGS. 16 to 24, there is shown a third embodiment of the shift control system according to the present invention. The third embodiment has a construction basically the same as that of the first embodiment shown in FIG. 1 and executes a shift operation based on the engagement logic shown in FIG. 2. Therefore, the explanation thereof is basically omitted herein.

Figure 24:
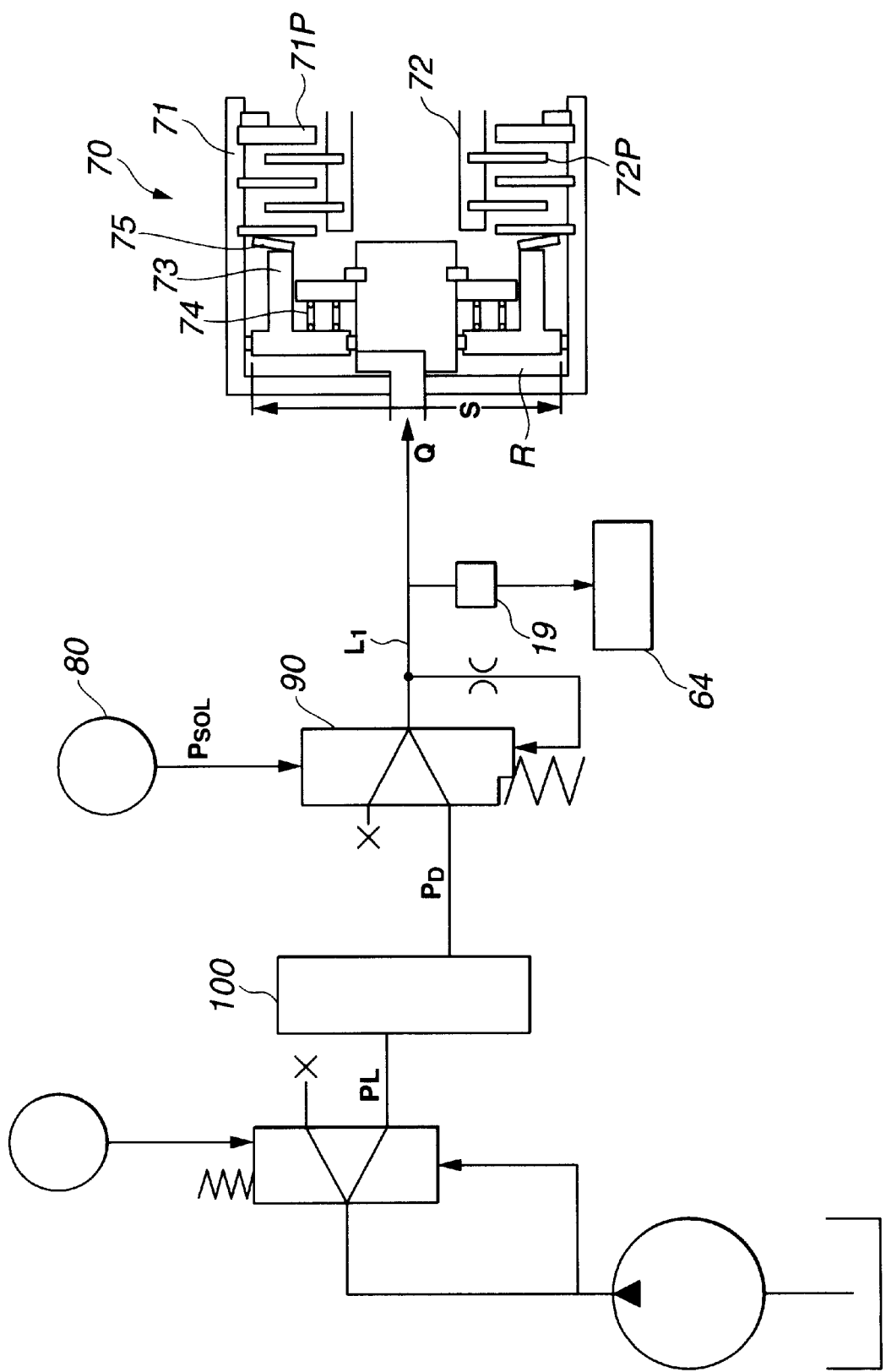
FIG. 24 is a schematic view showing an oil pressure circuit for supplying a clutch pressure controlled by a solenoid valve from an oil pressure control valve to a clutch drum employed in the fourth embodiment according to the present invention.

In this third embodiment, the elements in the oil pressure control system are disclosed in more detail as compared with those of the first and second embodiments. As shown in FIG. 24 the oil pressure control system is arranged to control a clutch pressure supplied to a drum clutch 70 through an amplifier valve (oil pressure control valve) 90. The amplifier valve 90 is installed to the clutch drum 70 and controlled by a solenoid oil pressure $P_{SOL}$. The amplifier valve 90 uses a D-range pressure supplied from the manual valve 100 as a base pressure and is capable of generating a clutch pressure having a magnitude ranging from 0 to $P_D$ (base pressure). The drum clutch 70 is arranged to engage clutch plates 71p and clutch plates 72p in a manner that an operation piston 73 receives a clutch pressure (engage-side oil pressure $P_C$) pushes a dish plate 75 against the return spring 74. The disengagement thereof is executed by applying the clutch pressure (disengage-side oil pressure $P_O$) and by separating the operation piston 73 from the dish plate 75 due to the biasing force of a return spring 74.

The oil pressure switch 19 is installed to an oil passage L1 connecting the clutch drum 70 and the amplifier valve 90, and functions as an oil pressure detecting means for detecting that the engage-side oil pressure PC or disengage-side oil pressure PO supplied to the drum clutch 20 reaches a predetermined target pressure P1. The oil pressure switch 19 outputs a detection signal changed between ON state and OFF state to the transmission controller 14. The detection signal may be ON signal or OFF signal.

Hereinafter, with reference to the control program of 2-3 upshift where the high clutch H/C acts as an engage-side friction element and the 2-4 brake 2-4/B acts as a disengage-side friction element, the control of the disengage-side and engage-side command oil pressures PO and PC will be discussed.

Figure 16:
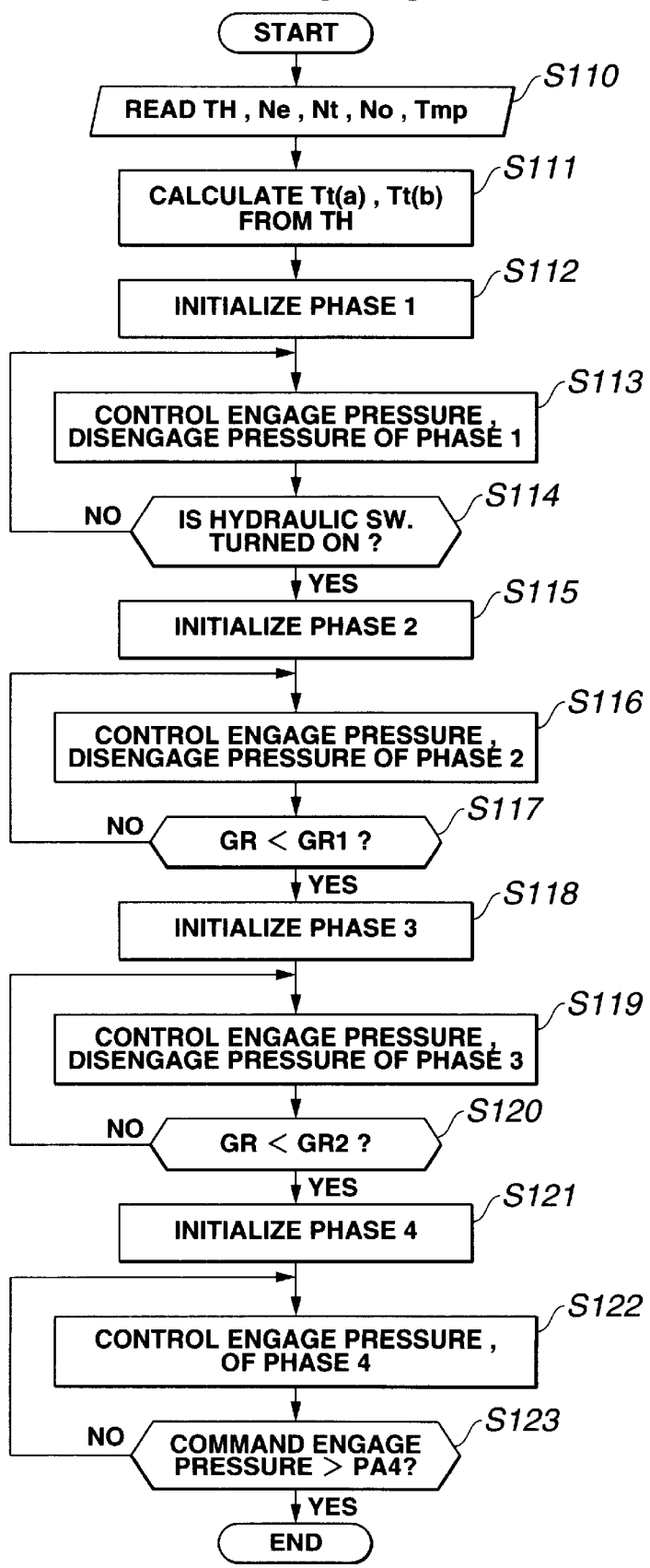
FIG. 16 is a flowchart showing a main routine of the control program of the engage-side command oil pressure and the disengage-side command oil pressure in the case that the shift control system according to a third embodiment of the present invention executes an interchange shift of the upshift.

At step S110 of FIG. 16, the transmission controller 14 reads the throttle opening TVO, the engine rotational speed Ne, the turbine rotational speed Nt, the output shaft rotational speed No, and the oil temperature Tmp from the sensors coupled with the transmission controller 14.

At step S111 the transmission controller 14 calculates an output shaft torque Tt(a) at the start of the shift and an output shaft torque Tt(b) at the end of the shift form the throttle opening TVO.

At step S112 the transmission controller 14 executes the initialization of Phase 1 on the basis of the information obtained at steps S110 and S111.

Figure 17:
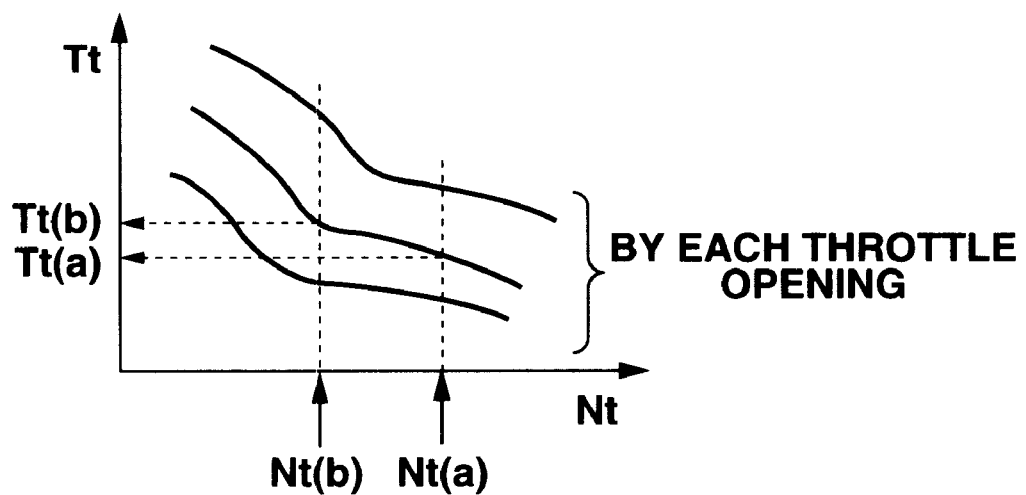
FIG. 17 is a graph showing a characteristic of an output shaft torque Tt relative to a turbine rotational speed Nt.

More specifically, the output shaft torque Tt is calculated from a characteristic graph shown in FIG. 17. The output shaft torque Tt has been set by each throttle opening TVO and is calculated from the turbine rotational speed Nt according to the throttle opening TVO. The output shaft torque Tt(a) at the start of the shift is calculated from the turbine rotational speed Nt(a) at the start of the shift according to the throttle opening TVO. Further, the output shaft torque Tt(b) at the end of the shift is calculated from the turbine rotational speed Nt(b) at the end of the shift according to the throttle opening TVO.

The turbine rotational speed Nt(a) at the start of the shift is directly detected, and the turbine rotational speed Tt(b) at the end of the shift is calculated from the following expression (2)

$$Nt(b)=Nt(a)\times(3^{rd}\ speed\ GR)/(2^{nd}\ speed\ GR) \qquad (2)$$

Following the execution at step S112, at step S113 the transmission controller 14 executes the control of the engage-side command oil pressure $P_C$ and the disengage-side command oil pressure $P_O$ during Phase 1. More specifically, the engage-side command oil pressure $P_C$ supplied to the high clutch H/C is controlled during a period from the start of moving the operation piston 23 to the end of the stroke operation where the operation piston 23 actually pushes clutch plates 21p and 22p through a dish plate 25 until such stroke is completed.

At step S114 the transmission controller 14 determines whether the ON signal of the oil pressure switch 19 is continuously detected for a predetermined time period $T_{CC}$. When the ON signal of the oil pressure switch 19 is not detected, the program returns to step S113 to continue the control in Phase 1. When the ON signal is detected, the program proceeds to step S115.

At step S115 the transmission controller 14 executes the initialization of Phase 2.

At step S116 the transmission controller 14 executes the control of the engage-side command oil pressure $P_C$ and the disengage-side command oil pressure $P_O$ during Phase 2. More specifically, the oil pressures employed to disengage the 2-4 brake 2-4/B and engage the high clutch H/C is controlled during a period from the end of the piston stroke to the start of the inertia phase.

At step S117 the transmission controller 14 determines whether or not the present gear ratio GR is smaller than the gear ratio $GR_1$ at the start of Phase 3. When the determination at step S117 is negative, that is, when the present gear ratio GR is not smaller than the gear ratio GR1 at the start of Phase 3 ($GR \geq GR_1$), the program returns to step S116 to repeat the pressure control in Phase 2. When the determination at step S117 is affirmative, the program proceeds to step S118.

At step S118 the transmission controller 14 executes the initialization of Phase 3.

At step S119 the transmission controller 14 executes the control of the engage-side command oil pressure $P_C$ and the disengage-side command oil pressure $P_O$ during Phase 4. More specifically, this control of the command oil pressures $P_C$ and $P_O$ is executed during the inertia phase from start to end.

At step S120 following the execution of step S119, the transmission controller 14 determines whether the present gear ratio GR is smaller than a gear ratio $GR_2$ at the start of Phase 4. When the determination at step S120 is negative, that is, when the present gear ratio GR is not smaller than the gear ratio $GR_2$ at the start of Phase 4 ($GR \geq GR_2$), the program returns to step S119 to repeat the pressure control in Phase 3. When the determination at step S120 is affirmative ($GR \geq GR_2$), the program proceeds to step S121.

At step S121 the transmission controller 14 executes the initialization of Phase 4.

At step S122 the transmission controller 14 executes the control of the engage-side command oil pressure $P_C$ and the disengage-side command oil pressure $P_O$ during Phase 4. More specifically, the transmission controller 14 commands the solenoid valves to supply the oil pressure to the high clutch H/C in order to complete the engagement of the high clutch H/C.

At step S123 the transmission controller 14 determines whether the engagement pressure command value TPA is greater than a predetermined command value PA4. When the determination at step S123 is negative, that is, when TPA≦PA4, the program returns to step S122 to continue the command pressure control in Phase 4. When the determination at step S123 becomes affirmative (TPA>PA4), the program proceeds to an end block to terminate this pressure control.

Figure 18A:
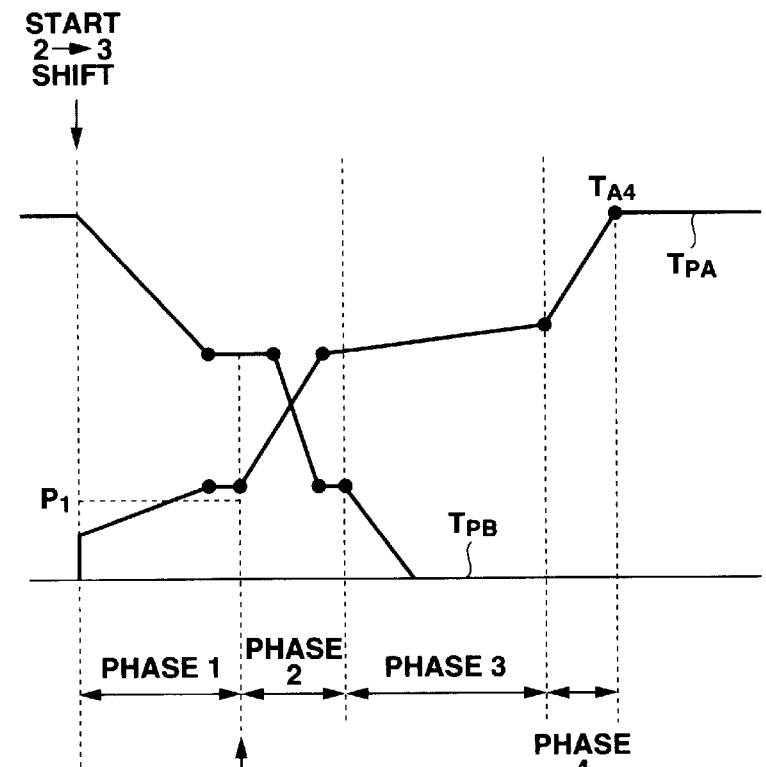
FIGS. 18A, 18B and 18C are time charts of the command pressures of the engage-side and the disengage-side, a transmission output torque, and a turbine rotational speed during the interchange upshift executed by the automatic transmission according to a third embodiment of the present invention.
Figure 18B:
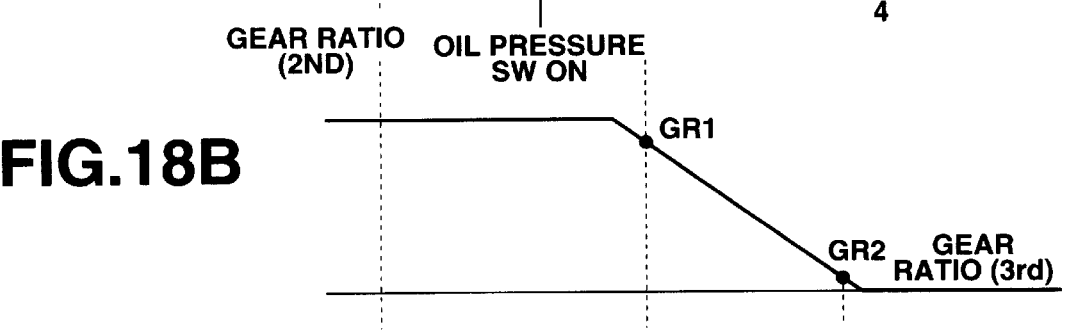
Figure 18C:

FIGS. 18A, 18B and 18C are time charts relating to the flowchart of FIG. 16. FIG. 18A shows the relationship between the engage-side command oil pressure TPA of the high clutch H/C and the disengage-side command oil pressure TPB of the 2-4 brake 2-4/B, FIG. 18B shows the gear ratio GR, and FIG. 18C shows the output shaft torque Tt outputted from the automatic transmission.

Figure 19:
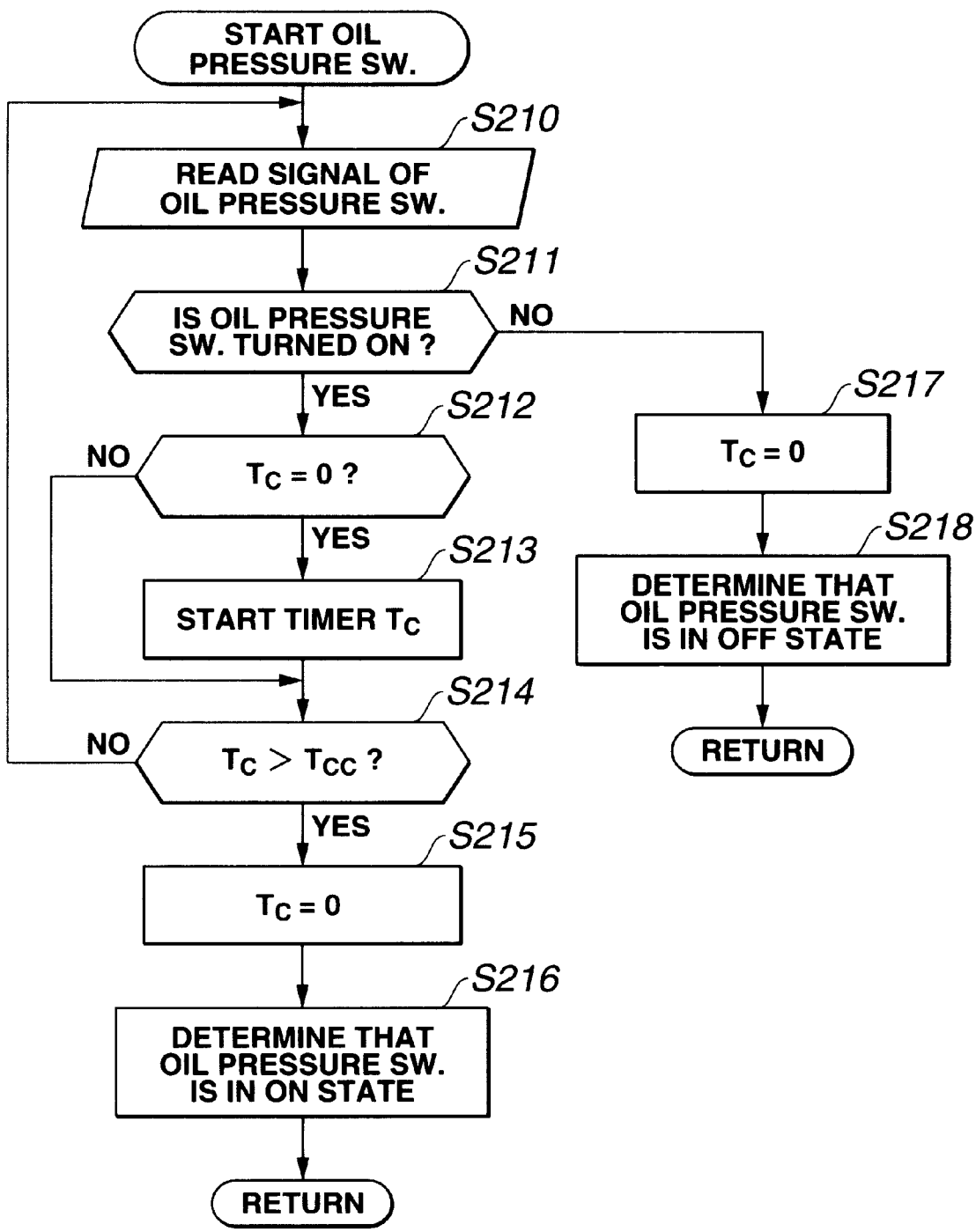
FIG. 19 is a flowchart showing a turn-on decision program of deciding whether an oil pressure switch is turned on, employed in the third embodiment according to the present invention.

FIG. 19 is a flowchart in the case that the oil pressure of the high clutch H/C is set at PC simultaneously with the start of the 2-3 upshift so as not to supply the pre-charge pressure $P_R$.

With reference to FIGS. 18A to 18C, the flowchart of FIG. 19 will be discussed in detail. As shown in FIG. 24, the oil pressure switch 19 employed in this embodiment is connected to the oil passage connecting the high clutch H/C and a valve 90 controlled by the solenoid valve 80. The oil pressure switch 19 is turned on and outputs the ON signal when the engage-side actual oil pressure Paa actually supplied to the high clutch H/C reaches a target oil pressure P1.

At step S210 the transmission controller 14 reads the signal indicative of ON or OFF state of the oil pressure switch 19.

At step S211 the transmission controller 14 determines whether the oil pressure switch is put in the ON state, on the basis of the received signal. When it is determined that the oil pressure switch 19 is turned ON, the program proceeds to step S212. When the determination at step S211 is negative, the program proceeds to step S217.

At step S212 following the affirmative decision at step s211, the transmission controller 14 determines whether the timer $T_C$ is set at zero or not. The transmission controller 14 commands the timer $T_C$ to start counting simultaneously with the start of the interchange shift. The timer $T_C$ may be a timer independently provided from the transmission controller 14.

If it is recognized that $T_C=0$ at step S212, at the start of the 2-3 upshift, the program proceeds to step S213 wherein the timer $T_C$ is started.

At step S213 the transmission controller 14 starts the timer $T_C$.

At step S214 the transmission controller 14 determines whether the count $T_C$ of the timer reaches a predetermined time period $T_{CC}$ or not. That is, until a predetermined time period $T_C$ elapses from the start of the 2-3 upshift, the program returns to step S210 and continue the counting of the timer $T_C$. Since the content of the timer $T_C$ is not zero ($T_C \neq 0$) during the 2-3 upshift, the program jumps from step S212 to step S214.

Figure 20:
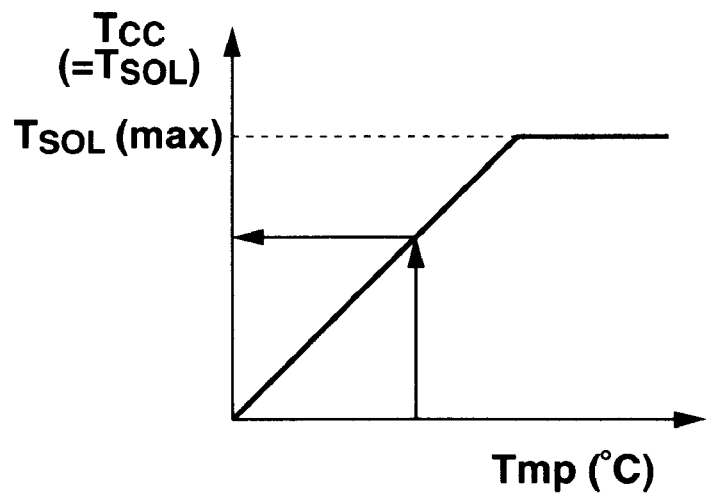
FIG. 20 is a graph employed for calculating a predetermined time period $T_{CC}$ measured by a timer from an oil temperature Tmp.

In this embodiment, the predetermined time period $T_{CC}$ is set at a solenoid drive cycle $T_{SOL}$ for executing the duty control of the oil pressure $P_C$ of the high clutch H/C as shown in FIG. 20. This duty control is determined on the basis of the oil temperature Tmp. For example, the solenoid drive cycle $T_{SOL}$ is a value employed in the duty control of the solenoid oil pressure $P_{SOL}$ generated by the solenoid valve 80. Since the predetermined time period $T_{CC}$ is determined taking account of the deviation of the solenoid drive cycle due to the change of the oil temperature Tmp, it is possible to properly eliminate a hydraulic vibration caused by the duty control of the oil pressure $P_C$ of the high clutch H/C by a time according to the oil temperature Tmp.

Further, the predetermined time period $T_{CC}$ is set at the maximum value $T_{SOL(max)}$ of the solenoid drive cycle $T_{SOL}$ (of the duty control of the oil pressure $P_C$ of the high clutch H/C). Accordingly, the predetermined time period $T_{CC}$ is set at a time period by which the hydraulic vibration generated by the duty control of the high clutch H/C oil pressure $P_C$. This arrangement enables the hydraulic vibration due to the duty control to be firmly and easily eliminated regardless the oil temperature Tmp.

When the determination at step S214 is affirmative ($T_C>T_{CC}$), that is, the transmission controller 14 determines that the ON signal of the oil pressure switch 19 is continuously detected for the predetermined time period $T_{CC}$, and the program proceeds to step S215.

At step S215 the transmission controller 14 resets the timer ($T_C=0$). Then the program proceeds to step S216 wherein the transmission controller 14 determines that the ON signal generated by the oil pressure switch 19 is correct. As a result, step S114 of FIG. 16 determines that the oil pressure switch 19 is put in the ON state, on the basis of the determination of step S216 of FIG. 19, and therefore step S115 of FIG. 16 is executed.

Further, when the determination at step S211 in FIG. 19 is negative, that is, when the ON state of the oil pressure switch 19 is not continuously detected, or when the oil pressure switch 19 is set at OFF state, or when the ON signal generated by the oil pressure switch 19 is not correct, the program proceeds to step S217 wherein the timer $T_C$ is reset ($T_C=0$). Following this, at step S218 the transmission controller 14 determines that the oil pressure switch 19 is put in the OFF state, and therefore the program returns to step S210 to again continue the detection of the ON signal of the oil pressure switch 19. As a result, at step S114 of FIG. 17 the transmission controller 14 determines that the oil pressure switch 19 is put in the OFF state, and therefore the program of FIG. 16 returns to step S113.

Figure 21A:
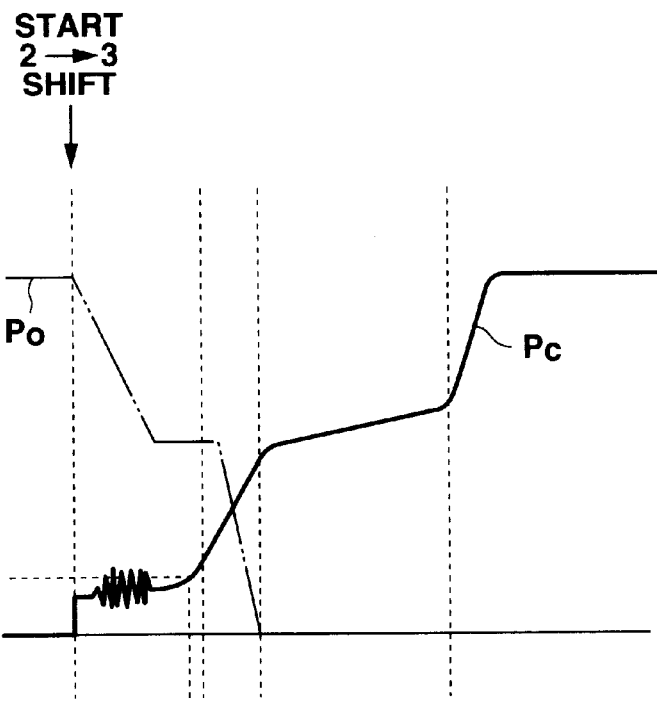
FIGS. 21A, 21B, 21C, 21D and 21E are time charts for explaining the shift control employed in the third embodiment of the present invention.
Figure 21B:
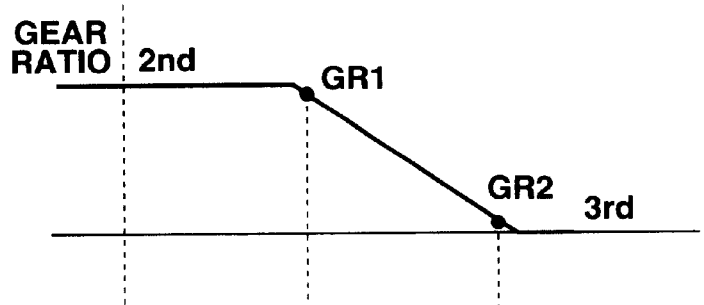
Figure 21C:
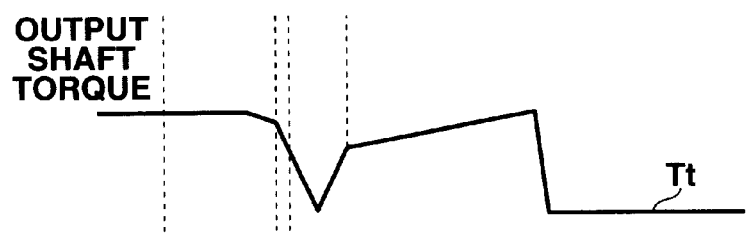
Figure 21D:
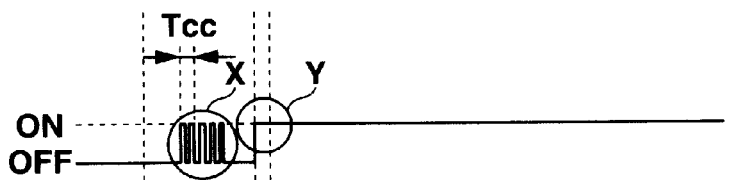
Figure 21E:
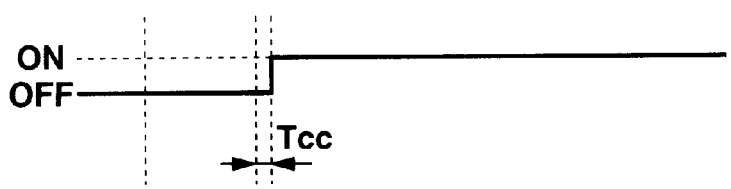

FIGS. 21A to 21E show time charts representative of the 2-3 upshift. FIG. 21A shows a relationship between the engage-side oil pressure PC actually supplied to the high clutch H/C and the disengage-side oil pressure actually supplied to the 2-4 brake 2-4/B during the 2-3 upshift. FIG. 21B shows a change of the gear ratio GR during the 2-3 upshift wherein the engage-side oil pressure Pc is denoted by a slid line and the disengage-side oil pressure $P_O$ is denoted by an alternate long and short dash line. FIG. 21C shows a change of the output shaft torque Tt during the 2-3 upshift. FIG. 21D shows the change between ON and OFF states of the oil pressure switch 19 generated by the hydraulic vibration. FIG. 21E shows the ON signal of the oil pressure switch 19, detected by the transmission controller 14.

With the thus arranged embodiment according to the present invention, in the case that the high clutch H/C does not receive a high pressure as the oil pressure $P_C$ thereof and that the flow-rate of the supplied oil decreases, as shown in FIGS. 21D and 21E, the timer is started simultaneously with a moment when the engage-side oil pressure $P_C$ supplied to the high clutch H/C reaches the target oil pressure $P_1$, that is, when the oil pressure switch 19 generates the ON signal. During the period when the timer $T_C$ counts the predetermined time period $T_{CC}$, only when the ON signal of the oil pressure switch 19 is continuously detected, the transmission controller 14 determines that the oil pressure $P_C$ of the high clutch H/C reaches the target oil pressure P1.

Accordingly, when the ON signal caused by the hydraulic vibration is not continuously generated in time series during the predetermined time period $T_{CC}$ as shown by reference X in FIG. 21D, the transmission controller 14 determines that the ON signal is not generated even if the hydraulic vibration is generated during the stroke operation of the operation piston 73. In contrast, when the ON signal is continuously generated for the predetermined time period $T_{CC}$ as shown reference Y in FIG. 21D, the transmission controller 14 determines that the ON signal is continuously generated as a correct ON signal. That is, the transmission controller 14 determines that the oil pressure $P_C$ of the high clutch H/C has stably reached the target oil pressure $P_1$ in case of reference Y of FIG. 21E.

That is to say, even if the ON/OFF chattering of the oil pressure switch 19 is generated by the hydraulic vibration under that condition that the high clutch H/C does not receive a high pressure as the oil pressure $P_C$ thereof and that the flow-rate of the supplied oil decreases, the shift control system according to the present invention firmly eliminates the ON signal generated under an unstable condition of the oil pressure $P_C$ of the high clutch H/C and can detect the ON signal under the stable condition of the oil pressure $P_C$. Therefore it becomes possible that the shift control system correctly decides that the oil pressure $P_C$ of the high clutch H/C reaches the target oil pressure $P_1$.

Accordingly, the embodiment according to the present invention is arranged to determine that the oil pressure $P_C$ of the high clutch H/C under the stable state has reached the target oil pressure $P_1$, and therefore it becomes possible to detect the target oil pressure $P_1$ under the stable condition in high accuracy.

More specifically, the embodiment according to the present invention prevents the incorrect determination that the operation piston 73 accomplished the stroke from the start position to the end position where the operation piston 73 presses the clutch plates 71p and 72p through the dish plate 75 although actually the operation piston 73 does not push the clutch plates 71p and 72p.

This arrangement suppresses the racing of the engine and the drop of the transmission output torque Tt which are caused by the capacity that it is difficult to correctly determine the completion of the piston stroke. Further, it becomes possible to ensure a smooth shift performance which does not generates a pushing-up shock caused by a large serge pressure.

Figure 22:
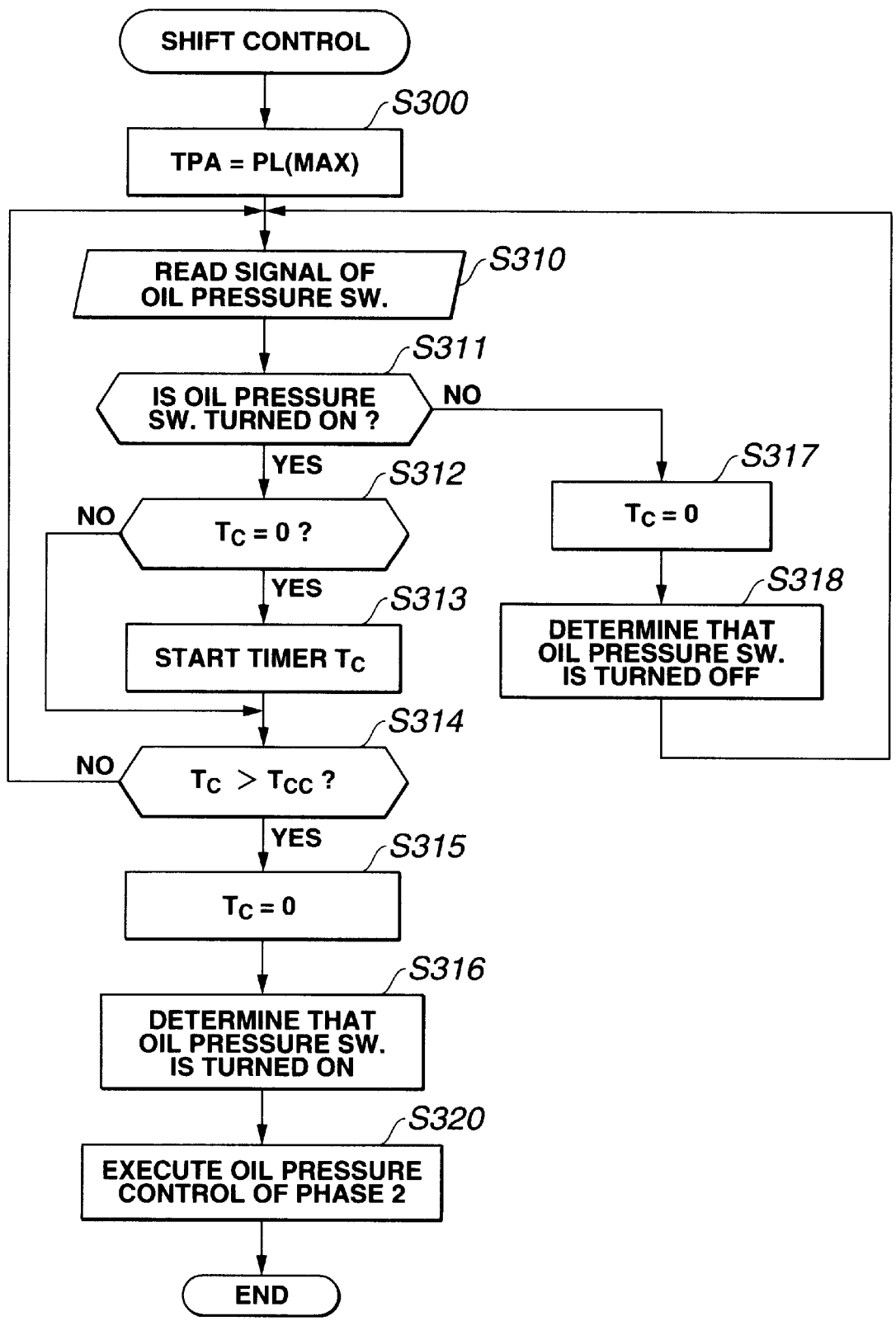
FIG. 22 is a flowchart is a flowchart showing the shift control program of a modification of the third embodiment according to the present invention.

FIG. 22 shows a modification of the third embodiment according to the present invention. The transmission controller 14 executes the flowchart of FIG. 22 showing the control executed in the case that the pre-charge pressure Pr is supplied to the high clutch H/C as the operation oil pressure Pc simultaneously with the start of the 2-3 upshift.

The oil pressure switch 19 employed in this modification of the third embodiment is arranged as shown in FIG. 24 and generates the ON signal when the command for supplying the pre-charge pressure Pr to the high clutch H/C is produced and then when the engage-side oil pressure $P_C$ actually supplied to the high clutch H/C reaches the target oil pressure $P_1$.

At step S300 the transmission controller 14 commands the solenoid valve 80 to supply the pre-charge pressure (such as the maximum pressure of the pressure which an amplifier valve 90 can generate) as the engage-side command pressure TPA.

At step S310 the transmission controller 14 reads the ON/OFF state of the oil pressure switch 19.

At step S311 the transmission controller 14 determines whether or not the ON signal is generated from the oil pressure switch 19. When it is determined that the ON signal is generated, the program proceeds to step S312 wherein the transmission controller 14 determines whether or not the timer Tc is set at the initial state.

At step S312 following the affirmative decision at step S311, the transmission controller 14 determines whether the timer Tc is set at zero or not. The transmission controller 14 commands the timer Tc to start counting simultaneously with the start of the interchange shift. The timer Tc may be a timer independently provided from the transmission controller 14.

If it is recognized that $T_C$ 32 0 at step S312, at the start of the 2-3 upshift, the program proceeds to step S313 wherein the timer $T_C$ is started.

At step S313 the transmission controller 14 starts the timer $T_C$.

At step S314 the transmission controller 14 determines whether the count $T_C$ of the timer reaches a predetermined time period $T_{CC}$ or not. That is, until a predetermined time period $T_{CC}$ elapses from the start of the 2-3 upshift, the program returns to step S310 and continues the counting of the timer $T_C$. Since the content of the timer $T_C$ is not zero ($T_C \neq 0$) during the 2-3 upshift, the program jumps from step S312 to step S314.

In this embodiment, the predetermined time period $T_{CC}$ is set at a solenoid drive cycle $T_{SOL}$ for executing the duty control of the oil pressure $P_C$ of the high clutch H/C as shown in FIG. 20.

When the determination at step S314 is affirmative ($T_C > T_{CC}$), that is, the transmission controller 14 determines that the ON signal of the oil pressure switch 19 is continuously detected for the predetermined time period $T_{CC}$, and the program proceeds to step S315.

At step S315 the transmission controller 14 resets the timer ($T_C = 0$). Then the program proceeds to step S316 wherein the transmission controller 14 determines that the ON signal generated by the oil pressure switch 19 is correct.

Following the execution of step S316, the program proceeds to step S320 wherein the transmission controller 14 executes the oil pressure control of Phase 2 on the basis of the ON state decision.

Further, when the determination at step S311 in is negative, that is, when the ON state of the oil pressure switch 19 is not continuously detected, or when the oil pressure switch 19 is set at OFF state, or when the ON signal generated by the oil pressure switch 19 is not correct, the program proceeds to step S317 wherein the timer $T_C$ is reset ($T_C = 0$). Following this, at step S318 the transmission controller 14 determines that the oil pressure switch 19 is put in the OFF state, and therefore the program returns to step S310 to again continue the detection of the ON signal of the oil pressure switch 19.

FIGS. 23A to 23E show time charts relating to the 2-3 upshift according to the embodiment of the present invention. More specifically, FIG. 23A shows a relationship between the engage-side oil pressure $P_C$ actually supplied to the high clutch H/C and the disengage-side oil pressure actually supplied to the 2-4 brake 2-4/B during the 2-3 upshift. FIG. 23B shows a change of the gear ratio GR during the 2-3 upshift wherein the engage-side oil pressure $P_C$ is denoted by a slid line and the disengage-side oil pressure $P_O$ is denoted by an alternate long and short dash line. FIG. 23C shows a change of the output shaft torque Tt during the 2-3 upshift. FIG. 23D shows the change between ON and OFF states of the oil pressure switch 19 generated by the hydraulic vibration. FIG. 23E shows the ON signal of the oil pressure switch 19, detected by the transmission controller 14.

In this embodiment, when the high clutch H/C is engaged for achieving the interchange shift, the transmission controller 14 generates the command for supplying the pre-charge pressure Pr to the high clutch H/C, and the transmission controller 14 then detects that the engage-side oil pressure $P_C$ to be supplied to the high clutch H/C has reaches the predetermined oil pressure P1, by receiving the signal of the oil pressure switch 19.

With the thus arranged embodiment according to the present invention, in the case that the high clutch H/C receives a high pressure as the oil pressure $P_C$ thereof and that the flow-rate of the supplied oil increases, as shown in FIGS. 23D and 23E, the timer is started simultaneously with a moment when the engage-side oil pressure $P_C$ supplied to the high clutch H/C reaches the target oil pressure P1, that is, when the oil pressure switch 19 generates the ON signal. During the period when the timer $T_C$ counts the predetermined time period $T_{CC}$, only when the ON signal of the oil pressure switch 19 is continuously detected, the transmission controller 14 determines that the oil pressure $P_C$ of the high clutch H/C reaches the target oil pressure P1.

Accordingly, when the ON signal caused by the hydraulic vibration is not continuously generated in time series during the predetermined time period $T_{CC}$ as shown by reference X in FIG. 23D, the transmission controller 14 determines that the ON signal is not generated even if the hydraulic vibration is generated during the stroke operation of the operation piston 73. In contrast, when the ON signal is continuously generated for the predetermined time period $T_{CC}$ as shown reference Y in FIG. 23D, the transmission controller 14 determines that the ON signal is continuously generated as a correct ON signal. That is, the transmission controller 14 determines that the oil pressure $P_C$ of the high clutch H/C has stably reached the target oil pressure P1 in case of reference Y of FIG. 23E.

That is to say, even if the ON/OFF chattering of the oil pressure switch 19 is generated by the hydraulic vibration under that condition that the high clutch H/C receives a high pressure as the oil pressure $P_C$ thereof and that the flow-rate of the supplied oil increases, the shift control system according to the present invention firmly eliminates the ON signal generated under an unstable condition of the oil pressure $P_C$ of the high clutch H/C and can detect the ON signal under the stable condition of the oil pressure $P_C$. Therefore it becomes possible that the shift control system correctly decides that the oil pressure $P_C$ of the high clutch H/C reaches the target oil pressure P1.

Accordingly, the embodiment according to the present invention is arranged to determine that the oil pressure $P_C$ of the high clutch H/C under the stable state has reached the target oil pressure P1, and therefore it becomes possible to detect the target oil pressure $P_1$ under the stable condition in high accuracy.

More specifically, the embodiment according to the present invention prevents the incorrect determination that the operation piston 73 accomplished the stroke from the start position to the end position where the operation piston 73 presses the clutch plates 71p and 72p through the dish plate 75 although actually the operation piston 73 does not push the clutch plates 71p and 72p, as shown in FIG. 24.

This arrangement suppresses the racing of the engine and the drop of the transmission output torque Tt which are caused by the capacity that it is difficult to correctly determine the completion of the piston stroke. Further, it becomes possible to ensure a smooth shift performance which does not generate a pushing-up shock caused by a large serge pressure.

The entire contents of Japanese Patent Applications Nos. 2000-282315, 2000-282314 and 2000-282317 filed on Sep. 18, 2000 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A shift control system of an automatic transmission, the automatic transmission comprising a first friction element which is engaged by increasing a first oil pressure supplied to the first friction element and a second friction element which is disengaged by decreasing a second oil pressure supplied to the second friction element in response to a pressure signal of the first oil pressure, an interchange shift of the automatic transmission being executed by interchanging engagement conditions of the first and second friction elements, the shift control system comprising:
a controller arranged
to decrease the second oil pressure of the second friction element by a second predetermined gradient after a loss stroke of the first friction element is terminated,
to increase the first oil pressure of the first friction element by a first predetermined gradient after the loss stroke of the first friction element is terminated,
to determine the first gradient such that a difference between a command pressure and an actual pressure of the first friction element is kept substantially constant.

2. The shift control system as claimed in claim 1, wherein the increase of the command oil pressure of the first friction element is started from an initial pressure by the first gradient.

3. The shift control system as claimed in claim 2, wherein the initial pressure is set at a minimum pressure at a start of the loss stroke executed before the engagement of the first friction element.

4. The shift control system as claimed in claim 2, wherein after the command pressure reaches an upper limit, the command pressure is maintained at the upper limit until the actual output pressure reaches a value indicative of termination of the loss stroke.

5. The shift control system as claimed in claim 4, wherein the upper limit of the command pressure is set to be greater than the actual output pressure at the termination of the loss stroke and to be smaller than the sum of the actual pressure at the termination of the loss stroke and a predetermined value.

6. The shift control system as claimed in claim 5, wherein the predetermined value is set at a value smaller than or equal to 50 kPa.

7. The shift control system as claimed in claim 1, further comprising an oil pressure switch which generates a signal indicative that an oil pressure of each of the friction elements reaches a target pressure, wherein the controller is arranged to count a first time period from a moment that the oil pressure switch generates the signal.

8. The shift control system as claimed in claim 7, wherein the controller is arranged to determine that the oil pressure of the friction element leaches a target oil pressure, only when the oil pressure switch continuously generates the signal during the first time period.

9. The shift control system as claimed in claim 7, wherein the first time period includes a solenoid driver cycle during when a duty control of the oil pressure of the friction element is executed.

10. A shift control system of an automatic transmission, the automatic transmission comprising a first friction element which is engaged by increasing a first oil pressure supplied to the first friction element and a second friction element which is disengaged by decreasing a second oil pressure supplied to the second friction element in response to a pressure signal of the first oil pressure, an interchange shift of the automatic transmission being executed by an interchange of engagement conditions of the first and second friction elements, the shift control system comprising:
a controller arranged
to decrease the second oil pressure of the second friction element by a second predetermined gradient after a loss stroke of the first friction element is terminated,
to increase the first oil pressure of the first friction element by a first predetermined gradient after the loss stroke of the first friction element is terminated,
to set a reference value for determining the termination of the loss stroke of the first friction element so as to be greater than the actual pressure at the actual termination of the loss stroke of the first friction element by a predetermined value.

11. The shift control system as claimed in claim 10, wherein the upper limit of the command pressure is set to be greater than the actual output pressure at the termination of the loss stroke and to be smaller than the sum of the actual pressure at the termination of the loss stroke and a predetermined value.

12. The shift control system as claimed in claim 11, wherein the predetermined value is set at a value smaller than or equal to 50 kPa.

13. A shift control system of an automatic transmission, the automatic transmission comprising a plurality of friction elements which are selectively engaged and disengaged to execute an interchange shift, the shift control system comprising:
an oil pressure switch changes ON/OFF state according to an actual oil pressure of one of the friction elements employed in the shift, the oil pressure switch outputting a signal indicative of the ON/OFF state of the oil pressure switch; and a controller coupled to the oil pressure switch, the controller being arranged,
- to count a predetermined time period from a moment when the controller receives the signal from the oil pressure switch,
- to determine that the oil pressure of the friction element reaches a target pressure, only when the oil pressure switch continuously outputs the signal for the predetermined time period.

14. The shift control system as claimed in claim 13, wherein the controller is arranged to determine that the oil pressure of the friction element leaches a target oil pressure only when the oil pressure switch continuously generates the signal during the first time period.

15. The shift control system as claimed in claim 13, wherein the first time period includes a solenoid driver cycle during when a duty control of the oil pressure of the friction element is executed.

* * * * *